United States Patent [19]
Dailey et al.

[11] Patent Number: 5,487,181
[45] Date of Patent: Jan. 23, 1996

[54] LOW POWER ARCHITECTURE FOR PORTABLE AND MOBILE TWO-WAY RADIOS

[75] Inventors: Timothy E. Dailey; Marc A. Dissosway; Russell L. Croucher, all of Forest, Va.

[73] Assignee: Ericsson GE Mobile Communications Inc., Lynchburg, Va.

[21] Appl. No.: 969,739

[22] Filed: Oct. 28, 1992

[51] Int. Cl.$^6$ ............................... H04B 1/40; H04B 7/32
[52] U.S. Cl. ............................. 455/89; 455/90; 455/343; 364/228.6; 364/230.2; 364/DIG. 1
[58] Field of Search .................. 455/38.3, 343, 455/89–90, 73, 76, 183.2, 127; 379/58; 345/89, 148; 370/110.2; 364/228.4–228.6, 230.2

[56] References Cited

U.S. PATENT DOCUMENTS

| | | | |
|---|---|---|---|
| 4,384,361 | 5/1983 | Masaki | 455/31 |
| 4,437,095 | 3/1984 | Akahori et al. | 340/825.44 |
| 4,562,307 | 12/1985 | Bursztejn et al. | 379/61 |
| 4,598,258 | 7/1986 | Babano | 331/14 |
| 4,731,814 | 3/1988 | Becker et al. | 379/62 |
| 4,830,832 | 4/1989 | Nagata et al. | 455/343 |
| 4,870,699 | 12/1989 | Garner | 455/76 |
| 4,887,311 | 12/1989 | Garner et al. | 455/76 |
| 4,901,036 | 2/1990 | Herold et al. | 455/183.2 |
| 4,903,319 | 2/1990 | Kasai et al. | 455/33 |
| 4,947,454 | 8/1990 | Garner | 455/88 |
| 4,977,611 | 12/1990 | Maru | 455/161 |
| 4,979,102 | 12/1990 | Tokuume | 364/200 |
| 5,001,776 | 3/1991 | Clark | 455/343 |
| 5,058,203 | 10/1991 | Inagami | 455/89 |
| 5,109,537 | 4/1992 | Toki | 455/343 |
| 5,159,765 | 10/1992 | Critchlow | 455/76 |
| 5,170,490 | 12/1992 | Cannon et al. | 455/343 |
| 5,175,759 | 12/1992 | Metroka | 379/58 |
| 5,241,537 | 8/1993 | Gulliford et al. | 370/110.2 |
| 5,280,650 | 1/1994 | Sobti | 455/38.3 |
| 5,295,178 | 3/1994 | Nickel et al. | 379/58 |
| 5,327,580 | 7/1994 | Vignali et al. | 455/15 |

FOREIGN PATENT DOCUMENTS 0034542  3/1980  Japan .................................. 455/343

OTHER PUBLICATIONS

"M–PD System . . . 136–174 MHz Personal Two–Way FM Radio Combination"; Maintenance Manual; GE Mobile Communications; LBI–31629A, May 1987.

Hitachi H8/532 HD6475328, HD6435328 Hardware Manual (Jan. 1992).

Hitachi Single–Chip Microcomputer H8/330 HD6473308, HD6433308 Hardware Manual—User's Manual (Dec. 1989).

*Primary Examiner*—Chi H. Pham
*Attorney, Agent, or Firm*—Nixon & Vanderhye

[57] ABSTRACT

An extremely compact, full featured portable radio architecture conserves power by allowing a processor to sleep except when it needs to perform tasks. A lower power processor which acts principally as an interrupt controller but which performs other functions as well (e.g., tone decode, synthesizer lock monitoring, etc.) so the main processor can sleep as much as possible and yet is assured of being awoken promptly when its processing power is required. The resulting portable radio has extremely low power consumption (e.g., on the order of 75 milliamperes during trunked mode operation)—thereby permitting even a relatively small battery pack to provide nearly 8 hours of continuous operation. The portable radio with battery is small and lightweight enough to fit into a front shirt pocket.

35 Claims, 14 Drawing Sheets

WAKE UP SEQUENCE

SHARED SERIAL PORTS

BOARD TYPE

5,487,181

LOW POWER ARCHITECTURE FOR PORTABLE AND MOBILE TWO-WAY RADIOS

FIELD OF THE INVENTION

The invention relates to improvements to radio transceivers, and more particularly, to features for reducing the power consumption of a portable and/or mobile two-way radio.

BACKGROUND AND SUMMARY OF THE INVENTION

Most people have at least seen, if not actually used, a hand-held ("walkie-talkie") portable two-way radio. Hand-held radios have revolutionized the way some people work. For example, a police officer can bring a hand-held radio when investigating on foot—thereby increasing safety and effectiveness due to the ability to instantaneously communicate with a dispatcher or other police officers. Fire and rescue workers, paramedics, power and telephone company field technicians, and other people performing tasks critical to general safety and welfare greatly benefit from hand-held two-way radios.

Smaller is generally better when it comes to hand-held radios. Smaller radios are more convenient to carry, reduce user fatigue, and may be able to go places that larger radios cannot go. For example, undercover police officers are not able to carry large two-way radios since such radios could be easily seen and thus "tip off" criminals and others under investigation. A radio small enough to fit into the officer's front shirt pocket could be concealed underneath a normal jacket and thus could actually be carried by the police officer during covert and undercover operations. The ability of a police officer to carry such a two-way radio while undercover would greatly increase the officer's safety and undercover operations. However, various problems have in the past prevented such a compact full-featured radio from being widely produced.

Recent innovations in custom chip design allow radio designers to eliminate circuits, reduce the number of components and cut power drain. Thus, it is now possible to provide a full-featured digital radio transceiver in a very small, low profile package. However, battery miniaturization has not kept up with advances in semiconductor miniaturization. Whereas only a few years ago the size and weight of the battery constituted only a small percentage of the overall size and weight of a hand-held radio, the battery may now comprise a significant percentage (on the order of half) of the radio's size and weight.

Hand-held radios have long been powered by removable rechargeable battery packs that attach to the lower portion of the radio housing so as to become part of the radio hand grip. Such detachable reusable battery packs allow users to easily swap a recharged battery for a "dead" battery pack. The "dead" pack may then be recharged without removing the radio from service during the recharge procedure. Once charged, a battery pack should last at least as long as a typical work shift (e.g., eight hours) so that the radio user does not need to carry additional battery packs and/or swap batteries in the middle of a shift.

As everyone who has ever bought a flashlight knows, larger batteries deliver more current and thus have a longer life (assuming constant current draw). For example, a size "D" flashlight cell delivers several times the amount of current delivered by a much smaller "AA" penlight flashlight cell, and may thus power a lamp for a longer time (or power more powerful lamp for the same amount of time). However, the larger "D" cells are also several times more bulky and heavy as compared to penlight cells. If the amount of current continually being drawn by a radio from the battery can be decreased, then the radio can operate for a longer time on a single battery charge. Moreover, very low current consumption means that even a relatively small battery can be used to provide relatively long periods of operation.

Unfortunately, the sophisticated features provided on today's two-way radios require large amounts of software. This software can best be developed and maintained using high level languages such as C. However, these languages require high performance microcontrollers for proper execution speed.. These controllers require a great deal of current.

Some past designs have used multiple low performance microcontrollers, but such constructions prevent the use of high level languages and their advantages in development time and maintainability. Other designs have used a single low power microcontroller with custom hardware. This solution suffers from the same problems as multiple low performance controller technique, and also is not very flexible since the functions of the custom hardware become fixed once the custom hardware design is finalized. Other prior art designs may use the "sleep mode" of a processor to turn off the CPU, but may keep the peripherals running.

The present invention, in contrast, provides a miniaturized two-way radio design providing the performance offered by a high power CPU while also providing low current consumption. This low current consumption permits even a very small battery pack to power the radio for an entire (approximately 8 hour) shift. As a result, the radio with battery connected is light, lean and super compact. The preferred embodiment radio is the ideal portable for covert operations and any other applications where concealed and/or extremely miniaturized radios are required. For example, the preferred embodiment weighs less than 20 ounces (including battery), is slightly more than 1 inch deep, and is slender and lightweight enough to slip into a front shirt pocket.

Features provided by the presently preferred exemplary embodiment of the invention include:

Distribution of radio functions between a high-power/high-capability processor, a low-power/low-capability processor, and additional logic (e.g., an application specific integrated circuit) so that the high-power processor can be placed into a "software stand by" mode much of the time (i.e., except when actually needed);

A current saving architecture for a radio using software standby ("SSB") mode with ASIC support to switch from IRQ (maskable) to NMI (non-maskable) interrupt inputs;

Main CPU reads watchdog timer to accurately maintain system (real) time despite intermittent lapses into the sleep mode;

A free running timer performs channel guard decode thus allowing simultaneous decode of channel guard and T99 signalling using the single low power processor;

FIFO (first in first out) data buffer so that the high-power processor can sleep;

Pulse width modulator is used to control the backlight brightness of the LCD display and thus save current;

Low power processor decodes "low speed" digital signalling so high-power processor can sleep;

Low power processor monitors synthesizer lock line to allow high-power processor to sleep;

SSB is integrated into the high power processor operating system;

Serial port is shared between micro-controllers to provide great flexibility in design and current savings (i.e., allowing the low-power processor to handle serial messages while allowing the high-power processor to sleep); and Board type resistors identify the type of board.

BRIEF DESCRIPTION OF THE DRAWINGS

These and other features and advantages of the present invention will be better and more completely understood by referring to the following detailed description of a presently preferred exemplary embodiment in connection with the drawings, of which.

DETAILED DESCRIPTION OF THE PRESENTLY PREFERRED EXEMPLARY EMBODIMENT

Figure 1:
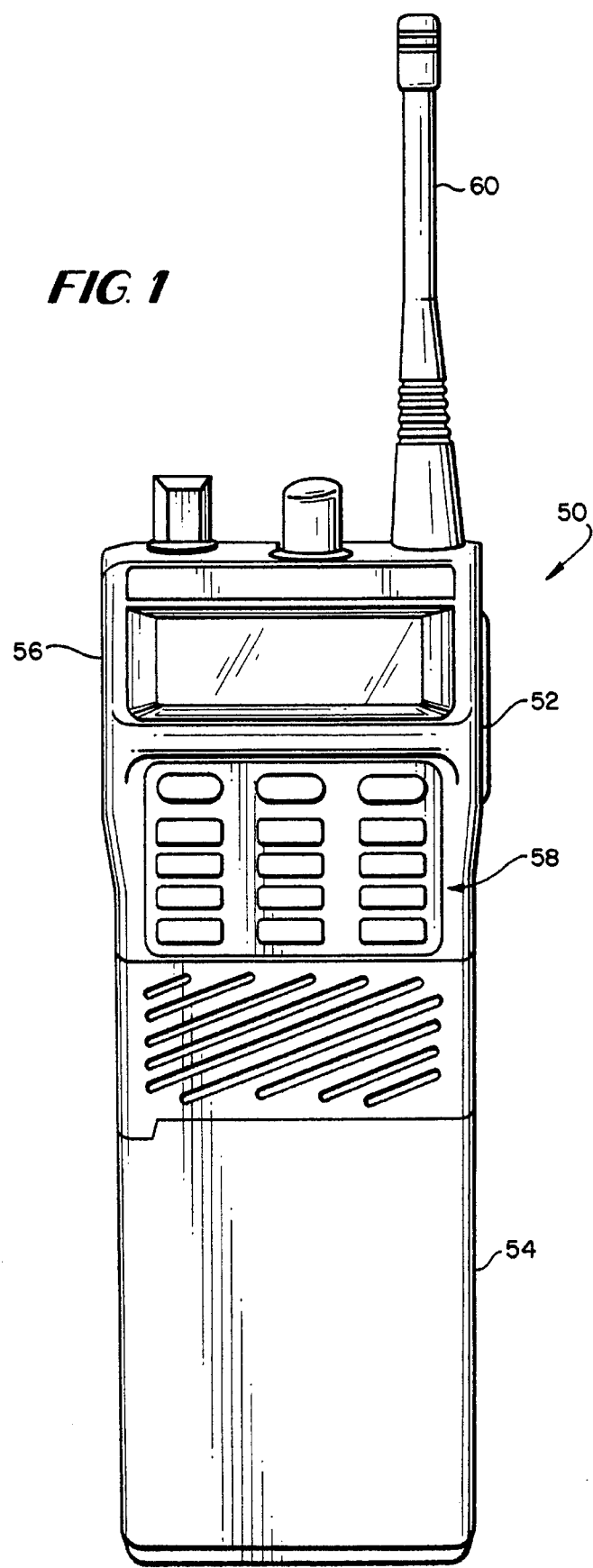
FIG. 1 is an elevated front view of a presently preferred exemplary embodiment of a portable two-way radio transceiver provided by the present invention.

FIG. 1 is a front elevated view of a presently preferred exemplary embodiment of a two-way portable hand-held radio transceiver ("radio") 50 provided by the present invention. Radio 50 includes a main unit 52 and a detachable battery pack 54. Main unit 52 includes all of the electronics (both digital control and radio frequency) required for two-way RF communications. Battery pack 54 is detachable and houses one or more rechargeable (e.g., NICAD) batteries that provide power for operating main unit 52. In the preferred embodiment, the battery pack may be provided in three different sizes for three different power lifetimes.

Preferred embodiment radio 50 is lightweight and slender. The following are exemplary dimension and weight specifications for main unit 52 and battery pack 54.

| INPUT VOLTAGE:<br>DIMENSIONS (Typical) H × W × D<br>Less Battery, Knobs and Antenna | | 7.5 VDC (nominal) |
|---|---|---|
| M-RK II (Display + keypad) | . | 4" × 2.7" × 1.6"<br>101 mm × 68 mm ×<br>40.6 mm |
| M-RK I (No Display + keypad) | | 4" × 2.7" × 1.18"<br>101 mm × 68 mm ×<br>30 mm |
| With High Capacity Battery | | |
| M-RK II: | | 7" × 2.7" × 1.16"<br>176.8 × 68 mm ×<br>40.6 mm |
| M-RK I: | | 7" × 2.7" × 1.18"<br>176.8 × 68 mm ×<br>30 mm |
| WEIGHT | | |
| M-RK II (Less Battery): | | 10 oz (258 g) |
| M-RK I (Less Battery): | | 8.8 oz (250 g) |
| BATTERIES | | |
| CAPACITY | DIMENSION (H × W × D) | WEIGHT |
| Medium | 2.54" × 2.7" × 1.1"<br>64.6 mm × 68 mm × 28 mm | 6.4 oz.<br>163 g |
| High | 3.1" × 2.7" × 1.1"<br>79.6 mm × 68 mm × 28 mm | 10.4 oz.<br>296 g |
| Extra High: | 3.8" × 2.9" × 1.1"<br>97.1 mm × 73 mm × 28 mm | TBD |

Figure 2:
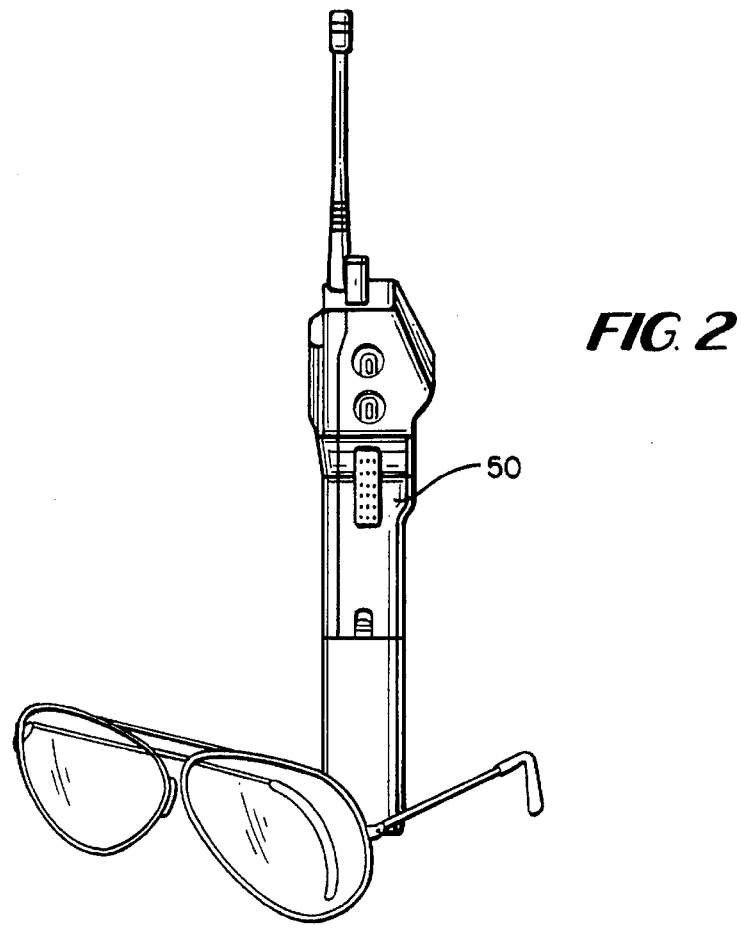
FIG. 2 is an elevated side view showing the FIG. 1 radio and, for size comparison purposes, a pair of conventional sunglasses.
Figure 3:
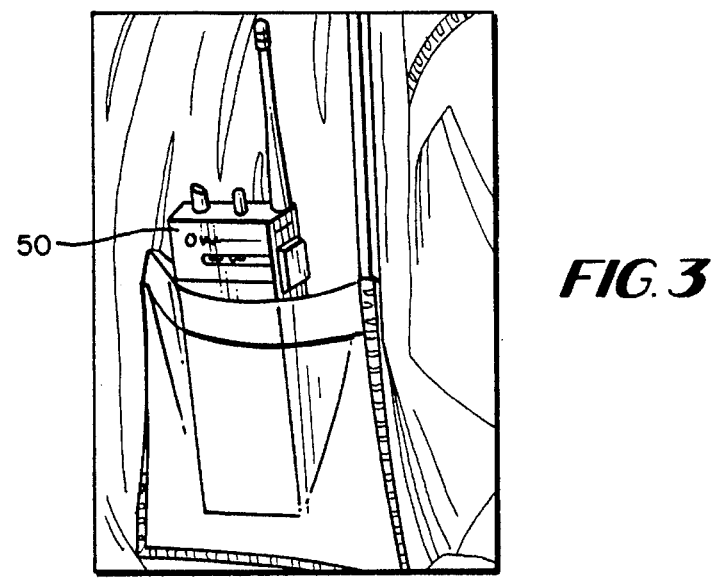
FIG. 3 is an elevated perspective view of the FIG. 1 radio resting within a user's front shirt pocket.

The radio shown in FIG. 1 includes an LCD display and a keypad 58. However, as indicated in the dimension/weight specification set forth above, in another embodiment the display 56 and keypad 58 may be omitted (with several light emitting diode indicators being used in lieu of the display) so as to provide an even smaller: depth and reduced weight. Without display 56 and keypad 58, radio 50 is so slim that it may easily be inserted into a front shirt pocket (see FIG. 3). Even with the display and keypad, the radio 50 is extremely slim and trim (see the side view of FIG. 2).

The following is a list of a few of the salient advantageous features of the radio 50 shown in FIG. 1:

| PRODUCT FEATURES | MAJOR BENEFITS |
|---|---|
| Small size and<br>light weight | Easy to carry, easy to conceal and<br>easy to use. |
| Top mounted rotary<br>controls | Convenient Eyes Free operation<br>while worn on the belt. |

-continued

| PRODUCT FEATURES | MAJOR BENEFITS |
| --- | --- |
| Two line dot matrix LCD (M-RK II) | Clear display of system and group information. Ideal for Alphanumerics. Characters invert 180° for easy-to-read viewing while worn on the belt. |
| System keypad (M-RK II) | Provides access to system and radio features like individual calls, scan, and menu select. Backlit for night viewing. |
| Remote radio disable | Allows dispatcher to "Kill" an EDACS radio in the event it is reported lost or stolen. |
| Emergency button | Immediate signalling of emergency condition including user ID to alert dispatch center and group users. |
| EDACS signalling | Includes all the benefits of EGE's EDACS fault tolerant communication. |
| Conventional signalling | Includes GE STAR ID/Emergency and TYPE 99 decoding for conventional radio ID and individual calling. |

Figure 4:
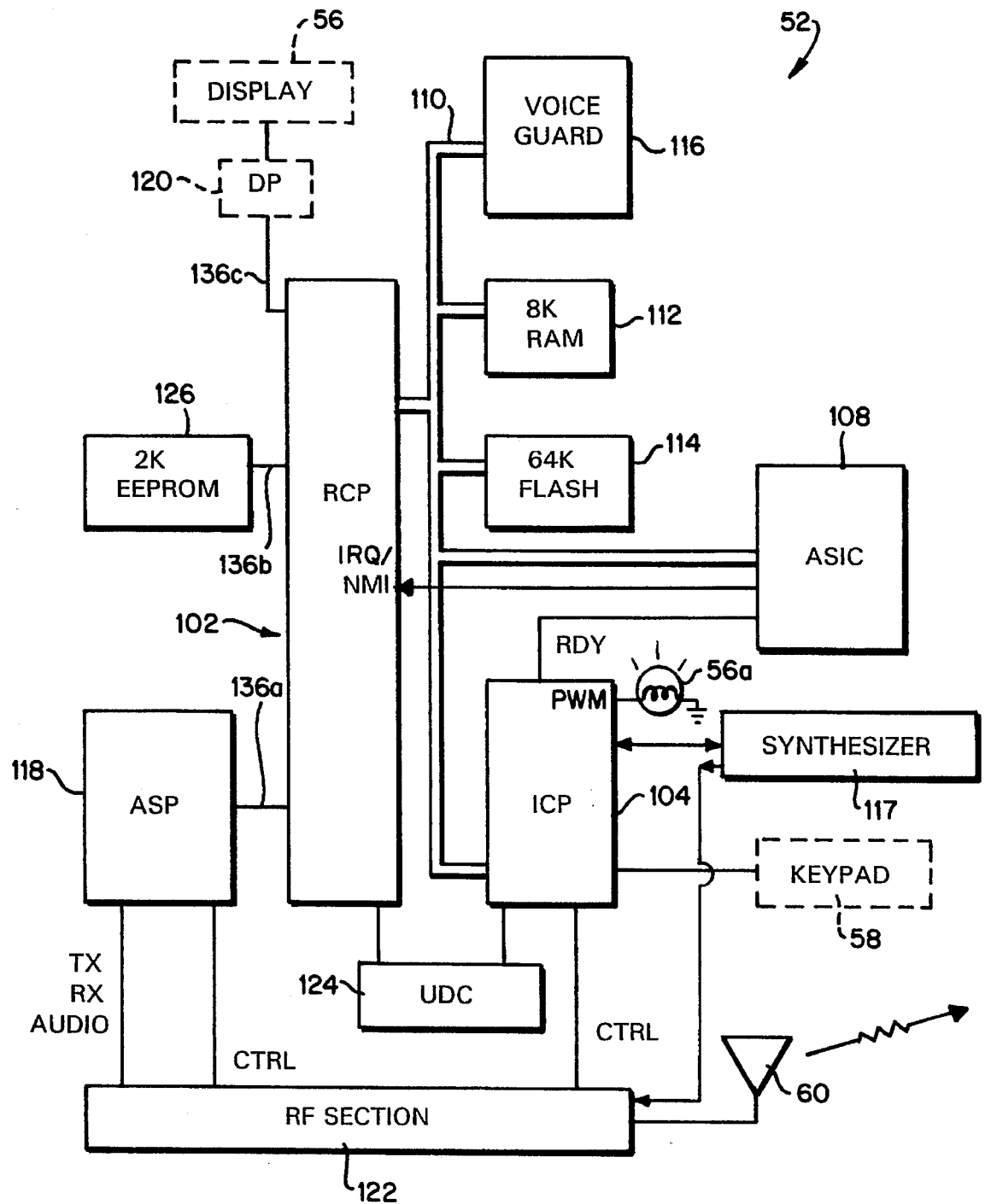
FIG. 4 is a high level block diagram of an exemplary architecture of electronics within the FIG. 1 radio.

FIG. 4 is a schematic diagram of an exemplary architecture of radio main unit 52 shown in FIG. 1. Main unit 52 includes a high-powered radio control processor ("RCP") 102; a lower-power interrupt control processor ("ICP") 104; and a custom application specific integrated circuit ("ASIC") 108. RCP 102, ICP 104 and ASIC 108 communicate with one another via a general-purpose conventional address/data bus 110. Also connected to bus 110 are random access memory 112, flash memory 114, and a digital voice guard block 116, all of conventional design. Voice guard module 116 provides encrypted voice communications. This module is of conventional design and communicates with RCP 102 via the address/data bus 110.

RCP 102 in the preferred embodiment comprises a Hitachi H8/532 micro-controller. RCP 102 is the high performance CPU coordinating all of the functions of main unit 52. ICP 104 in the preferred, embodiment is a Hitachi H8/330 single chip micro-computer which acts as a smart interrupt controller for RCP 102. More information regarding these conventional Hitachi processors may be found in various publicly available printed publications, including the following:

Hitachi Single-chip Microcomputer H8/330, HD6473308, HD66433308 Hardware Manual, ADE-602-026(0), published (1st Edition) December 1989 (Hitachi Corp.); and Hitachi H8/532, HD6475328, HD6435328 Hardware Manual, M21T002, published January 1992 (Hitachi Corp.).

Main unit 52 further includes a custom audio signal processor (ASP) 118 of conventional design that handles most of the audio filtering for the radio. ASP 118 may be a single chip device that is capable of powering down unused circuitry while continuing to generate alert tones. This allows RCP 102 to sleep while the alert tones are being generated, for example.

ICP 104 handles the user interfaces, performs tone decoding, and controls radio frequency synthesizer 116 in the preferred embodiment. ASIC 108 contains circuitry which handles the transmission and reception of digital information over the air. ASIC 108 further includes interrupt control circuitry, clock control circuitry and address decode logic. ASIC 108 is in some sense the "glue that holds everything together" in the preferred embodiment. ASIC 108 and its interaction with RCP 102 and ICP 104 will be described in more detail shortly.

Main unit 52 further includes an optional display processor 120 connected to LCD display 56. Display processor 120 in the preferred embodiment comprises an intelligent LCD display controller of conventional design including a four-bit micro-controller and integral LCD driver. This approach off loads many of the tedious display functions from RCP 102—allowing the RCP to sleep more. Display 56 in the preferred embodiment comprises two rows of eight characters using dot matrix characters.

RF section 122 performs all of the radio frequency signal processing within main unit 52. RF section 122, for example, modulates a radio frequency signal (generated at a frequency controlled by a conventional frequency synthesizer 117 under the control of ICP 104) with audio received from ASP 118 (or digitized audio received from voice guard block 116). RF section 122 transmits such modulated RF signals over the air via antenna 60. RF section 122 receives and detects RF signals at frequencies selected by synthesizer 117 and provides the detected audio to ASP 118 for filtering and further processing. A conventional microphone, loud speaker and associated amplification circuitry (not shown) is used to convert user's speech into audio signals and to convert received audio into sound for listening by the user.

A universal device connector ("UDC") 124 provides a digital serial port for coupling with the outside world. UDS 124 may be used, for example, to load new "personality" programming into the radio 50 from an external programming source. Such "personality" defining data specifies, for example, frequencies of operation, radio identification, group and individual IDs, and the like.

ICP 104

ICP 104 in the preferred embodiment is a masked H8/330 high performance single chip micro-computer providing 16K bytes of on chip ROM, 512 bytes of on chip RAM, 15 bytes of dual port RAM (for master/slave interface), serial I/O, general purpose I/O ports, and A/D converter and internal timers. The main function of ICP 104 is to handle user interface interrupts and tone decodes so that RCP 102 can remain in a low power state as much as possible. ICP 104 is thus treated more as an intelligent interrupt controller than as another independent CPU within the architecture of radio main unit 52. The functions performed by ICP 104 can be well defined and specified by internal masked ROM programming. The interface and operation of ICP 104 is as generic as possible to allow this component to support the different requirements of a mobile radio and a portable radio; and to support minor design changes without re-masking. Therefore, ICP 104 is programmed as a configurable I/O device that can perform tone decode, keypad and I/O manipulation. ICP 104 is preferably configured by RCP 102 at time of power up of radio main unit 52.

The primary functions of the ICP are: key-pad scan, discrete I/O monitoring, display backlight control, tone decodes, sub-audible tone encodes, low speed data decode, carrier detection/squelch control, RSSI monitoring, and synthesizer control.

In connection with keypad scan, ICP 104 scans the keypad 58 in a conventional manner to detect user depression of keys, and also monitors group knob and volume knob settings (see FIG. 1). If a key is depressed (or a knob is turned), ICP 104 notifies the RCP 102 via a dual port RAM message.

The discrete I/O monitoring performed by ICP 104 includes monitoring the emergency and push-to-talk ("PTT") buttons (not shown). These I/O signals are checked each time the keypad 50 is scanned. ICP 104 notifies RCP 102 if one of the buttons is depressed. ICP 104 also monitors its UART for data from UDC 124.

With regard to backlight control, ICP 104 includes an internal pulse width modulator timer module with two independent channels that are functionally identical. Each PWF channel generates a rectangular output pulse with a duty factor that is programmable from 0 to 100%. The duty factor is specified in an 8-bit duty register (DTR). See page 171 et seq. of the above-referenced H8/330 Hardware Manual. In the preferred embodiment, this pulse width modulator timer is used to control the brightness of a backlight 56a provided behind display 56. As is well known, LCD displays do not (unlike LED components) generate light but rather must rely on ambient lighting and/or backlighting for readability. The preferred embodiment provides a backlight behind display 56 which may be activated by RCP 102 each time the user depresses a key of keypad 58. In the preferred embodiment, ICP 104 drives this backlight using one of its PWM outputs. The duty cycle of the PWM output thus controls the brightness of backlighting. The backlight level is specified by RCP 102 in the preferred embodiment. Using the pulse width modulator allows the intensity of the backlight to be varied by the user to select the lowest usable intensity to save power.

With regard to tone encode and decode, ICP is capable of coding both channel guard and so called "T99" signalling simultaneously. Briefly, T99 decoding is performed in a conventional manner, while channel guard decoding is performed using an internal timer capture register. Further details regarding the channel guard decoding will be provided shortly. ICP 104 also performs channel guard and digital channel guard tone encoding using its two Walsh bits. This eliminates the potential risk that RCP 102 may not be able to successfully perform both DTMF and channel guard tone encoding simultaneously. With regard to low speed data decode, ICP 104 decodes EDACS conventional low speed data messages (which are substantially continually transmitted subaudibly over assigned channels). ICP 104 does not try to determine the contents of the message, but instead simply passes each valid message to RCP 102 for processing. This allows the RCP 102 to sleep more often while nevertheless permitting the higher capability RCP to perform content determinations.

With regard to carrier detection and squelch control, ICP 104 performs these functions as part of its standard tone decode operations. ICP 104 in the preferred embodiment also supplies carrier (i.e., squelch) information to RCP 102 to allow so-called "feature" tone decodes. RCP 102 is able to tailor the responsiveness (slow/fast) of the squelch attack provided by ICP 104 (e.g., by writing parameters to the ICP). ICP 104 also is responsible for loading (programming) synthesizer 117 and monitoring the lock status of the synthesizer (as will be explained in greater detail shortly).

Figure 18:
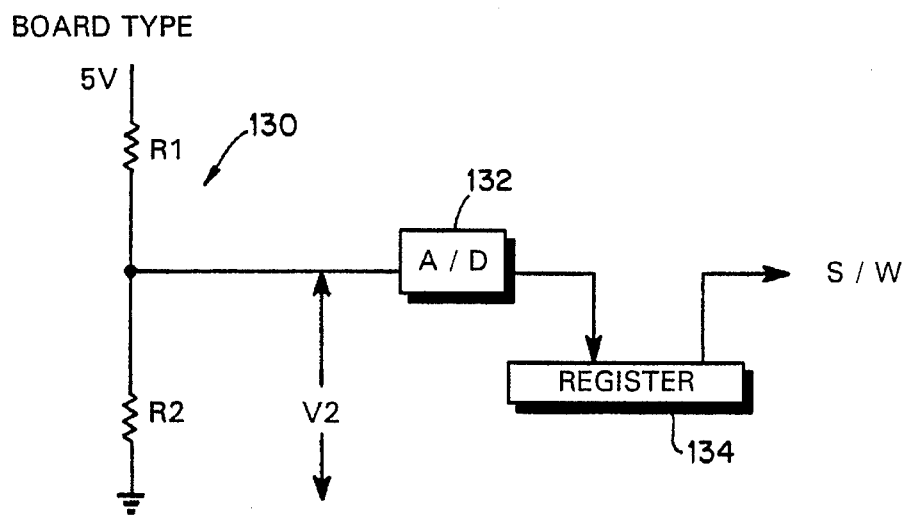
FIG. 18 is a schematic and block diagram showing an exemplary preferred technique provided by the preferred embodiment of the present invention for detecting board type.

In the preferred embodiment, ICP 104 also determines, based upon an analog voltage value applied thereto, the type of board or product in which the ICP is installed. Such determination may also be performed by RCP 102. This board type determination allows the ICP 104 (RCP 102) software to adjust automatically to different hardware configurations. In the preferred embodiment, the analog input signal is generated by a resistor divider network between Vcc and ground. The following exemplary board types have been defined with regard to ICP 104 in the preferred embodiment: MRK-I=ground, MRK-II=Vcc, and Delta 2=Vcc/2. Other voltage levels intermediate to Vcc and ground potential may be used to specify other board types if desired. FIG. 18 shows an exemplary resistive divider arrangement 130 that may be used to supply the analog voltage indicating board type. The V 2 output of divider 130 is coupled to an internal A/D converter 132 within ICP 104 (or RCP 102). The output of the A/D converter is read into a register 134 (also internal to the ICP or RCP), from which the register contents can be read by software. The software may branch or otherwise perform different functions depending on the register contents. This capability of ICP 104 (RCP 102) to automatically detect and adapt to the type of board or product in which it is installed allows a single "masked" processor to be used in a variety of different products without requiring changes to the mask.

RCP 102

RCP 102 is the main processor for radio main unit 52. RCP 102 has access to the RAM 112, flash memory 114, voice guard block 116, ICP 104, and IASIC 108 via data bus 110 (see FIG. 5, which schematically illustrates the address space of the RCP). In addition, RCP 102 has access to the ASP 118, EPROM 126 and display processor 120 via serial links 136A–136C.

As mentioned above, RCP 102 in the preferred embodiment is a Hitachi H8/532 microcomputer which runs at approximately 9.8304 megahertz or at some other value in multiple increments of 2.4576 megahertz (these frequencies were selected because they support the accurate generation of 38.4K baud data). It is preferable to use the slowest possible clock frequency because this reduces power consumption and spurs.

The Hitachi H8/532 has the following features which are advantageously used in the preferred embodiment of the present invention:

16-bit internal architecture 8 16-bit general purpose registers 32K bytes mask ROM

1K RAM

10-Bit A/D converter

Full duplex UART 3 16-bit timers 18-bit timer

Watchdog timer 3 pulse width timers

DMA

Interrupt controller

Current saving modes:
  Sleep mode
    CPU sleeps, but peripherals continue to work.
    Wakes up from peripheral interrupts.
    Reduces current drain 30%.
  Software Standby Mode (SSB)
    Pulls nano amps.
    Turns off CPU and peripherals.
    Maintains outputs but registers of onboard support modules are reset to initial values.
    Maintains internal RAM/registers.
    Wakes up in 52 micro seconds from non-maskable interrupt.

RCP 102 and ICP 104 communicate with one another via a dual port RAM within ICP 104. The protocol for the data exchange is defined in the H8/330 hardware manual. This on-chip dual port RAM is provided to permit access by both the CPU in the H8/330 chip and by a master CPU on another chip.

Figure 5:
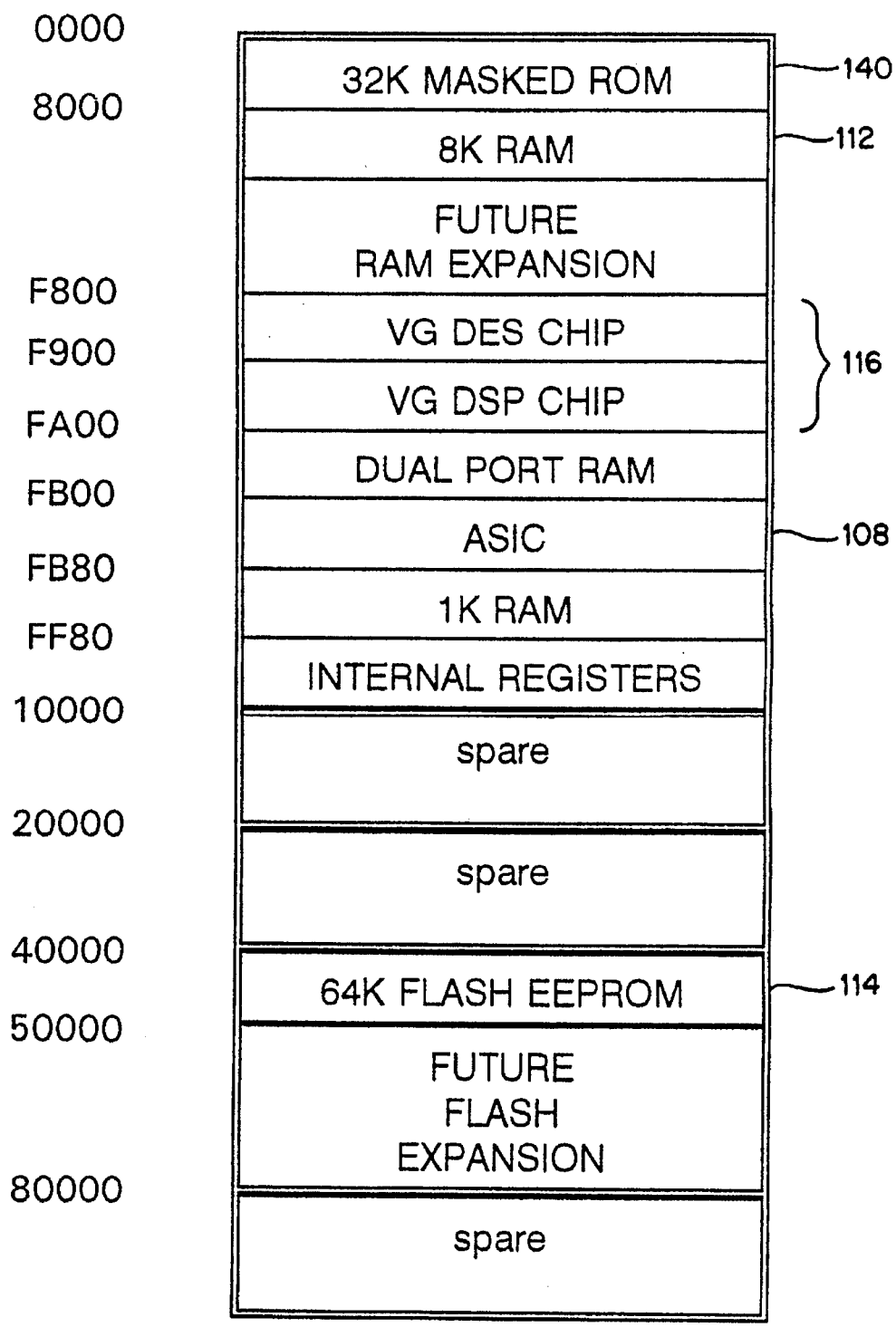
FIG. 5 is a schematic diagram of an exemplary address space for the "RCP" processor shown in FIG. 4.

The memory organization of main unit 52 will now be described in connection with FIGS. 4 and 5. Main unit in the preferred embodiment has a total of 9K of RAM—1K onboard RCP 102 and 8K on a RAM 112 connected via bus 110. This collection of RAM locations is available for variables, buffers, etc. RAM 112 is not battery backed up.

RCP 102 has 32K of masked ROM 140 onboard. Using this masked ROM 140 saves current by eliminating the power consumed by reading flash memory 114. Masked ROM 140 contains the following program elements (selected because they are stable, independent and easy to test);

BIOS—Basic Input/Output System. All the routines that interface directly to the hardware. This provides a layer of hardware independence. The application program calls BIOS routines to implement hardware dependent functions. If the hardware changes, only the BIOS need change. The application does not know the difference. The BIOS includes the bootstrap loader to load new program code in the flash.

Operating System—(event driven multi-tasking)

Routines that run continuously (this eliminates calls to flash memory and reduces current drain).

Routines that require fast execution.

Since the BIOS is masked, the preferred embodiment of the present invention provides a way to recover from many bugs that might crop up. This is done by using a BIOS vector table. The table contains a starting vector for each of the BIOS routines. The BIOS installs its vector table in RAM (e.g., internal RAM or external RAM 112) at power up. The applications program can overwrite the vector table to install a different BIOS routine. This allows bad routines to be replaced by new routines stored in flash memory 114. Interrupt routines are handled in a similar way in the preferred embodiment. Interrupt vectors are stored in masked ROM 140. Interrupts jump through a RAM vector to the actual interrupt routine. Information stored in flash memory 114 has the capability of installing or replacing these interrupt routines.

Main unit 52 has, as mentioned above, 64K of flash EPROM 114 available (additional address lines on bus 110 are available for expansion to 256K if space and cost allow). Flash memory 114 is an EEPROM that must be erased in large blocks rather than a byte at a time. The use of flash memory 114 allows an entire program to be changed without opening main unit 52, but single values (like current volume) cannot be changed individually. In the preferred embodiment, flash memory 114 contains the application program. This is the high level code that provides the user interface and otherwise defines the features and operations provided by radio main unit 52. In the preferred embodiment, this application program is written in the C language and is compiled for execution on the H8/532.

In the preferred embodiment, the flash memory 114 also contains a large part of the personality defining information described above. Flash memory 114 is not large enough to hold the entire personality defining data in the preferred embodiment. Therefore, any part of the personality defining data that cannot be changed by the user or over the air is stored in the flash memory 114. The remaining personality defining data is stored in EPROM 126 where it can be easily changed. This means that any time the personality data stored in the flash memory 114 needs to be changed, the program and personality must be uploaded (e.g., from a personal computer program of conventional design via universal device connector 124). The new personality is added to the code and is downloaded into main unit 52.

EPROM 126 is accessible via a IIC link 136B connected to RCP 102. EPROM 126 contains user configurable contents that must be maintained throughout a power cycle. These parameters include, for example, volume, current group/system, stored phone numbers, etc.

ASIC 108

ASIC 108 is basically a "glue chip" that integrates many miscellaneous functions. ASIC 108 provides the following features:

Data transmission and reception using programmable sync character (i.e., barker)

Sync character can have up to 4 bit errors

This allows the ASIC to get synchronized with the received data while the RCP sleeps 64 byte transmit/receive buffer This allows the ASIC to receive or transmit data while the RCP sleeps.

Limited full duplex operation.

Watchdog timer

This timer can be read by the RCP 102. The RCP 102 uses this timer to keep track of how long it was asleep so that it can update its own timers which are turned off in software standby mode.

Interrupt control circuitry

This supports interrupts related to data transmission and reception and also ties the RCP 102 and ICP 104 together to allow the RCP to sleep.

Clock control circuitry

This circuitry divides the single system clock down so that the lowest possible clock rates are used by each device.

Address decode

Figure 6:
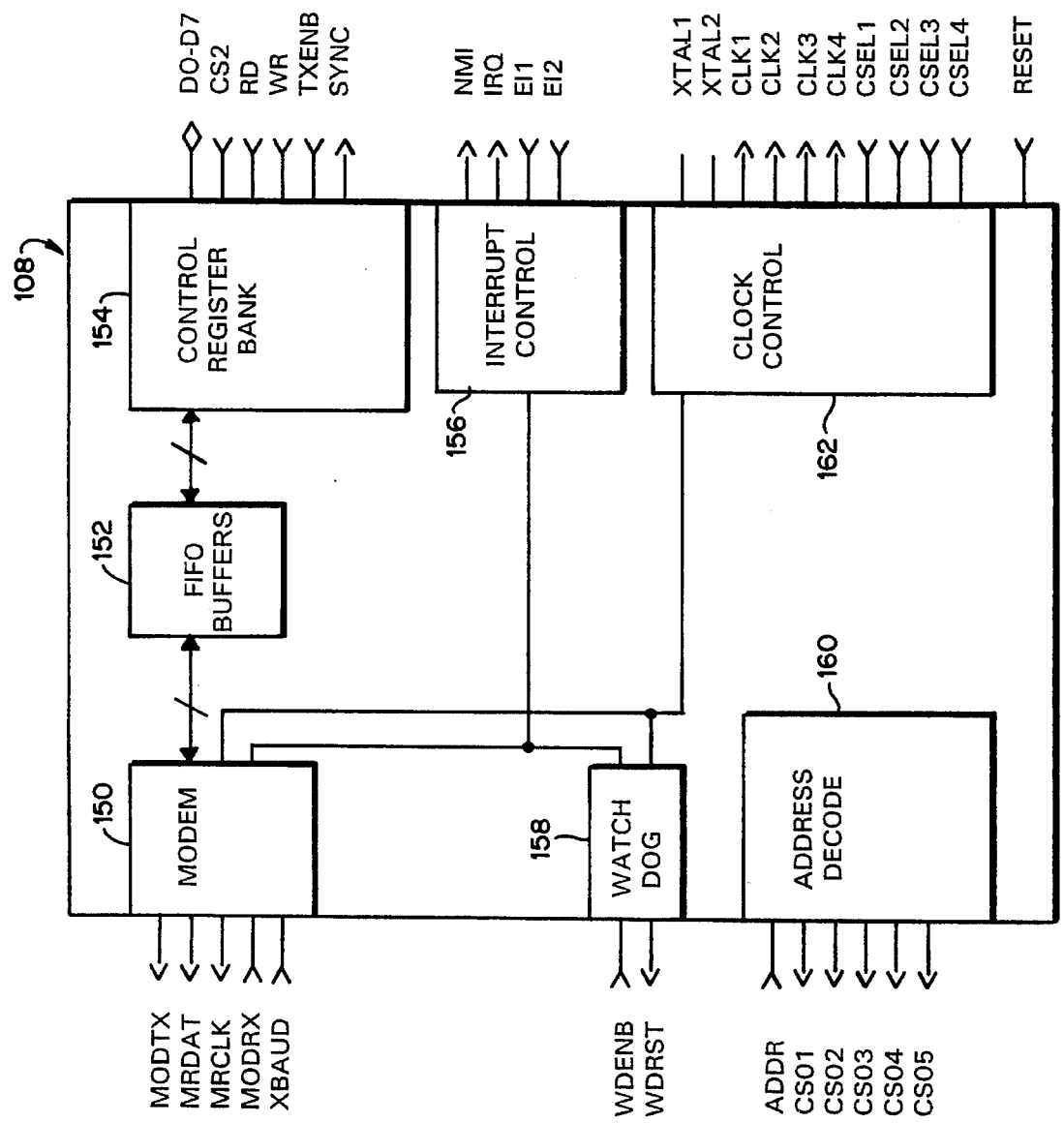
FIG. 6 is an exemplary block diagram of the ASIC shown in FIG. 4.

FIG. 6 is a block diagram of an exemplary architecture for ASIC 108 shown in FIG. 4. The primary purpose of ASIC 108 is to off-load tasks from RCP 102 so that the RCP can spend as much time as possible in the low power state. This greatly reduces the current requirements of radio main unit 52. In addition, the use of an ASIC ("application specific integrated circuit") for device 108 reduces printed circuit board space required and also reduces parts count.

As shown in FIG. 6, ASIC 108 includes a modem 150, a bidirectional first-in-first-out (FIFO) buffer 152, a control register bank 154, an interrupt controller 156, a watchdog timer 158, an address decoder 160, and a clock controller 162. Modem 150 is of conventional design, and permits digital data to be sent and received over the RF link. Control register bank 154 contains control and status registers, and is the interface point for RCP 102. RCP 102 can write to and/or read from registers within control register bank 154 via address bus 110.

The following is an exemplary definition of control registers within ASIC control register bank 154:

| Name | Read/Write | Description |
| --- | --- | --- |
| MDCR1 | W | Modem Divide Control Register (low) |
| MDCR2 | W | Modem Divide Control Register (high) |
| PMR1 | W | Pattern Match Register (low) |
| PMR2 | W | Pattern Match Register (high) |
| MACR | R/W | Match Control Register |
| MRCR | R/W | Modem Receive Control Register |

-continued

| Name | Read/Write | Description |
| --- | --- | --- |
| MTCR | R/W | Modem Transmit Control Register |
| MFTR | W | Modem FIFO Transmit Register |
| MFRR | R | Modem FIFO Receive Register |
| MBTR | W | Modem Bypass Transmit Register |
| MBRR | R | Modem Bypass Receive Register |
| MFCR | R/W | Modem FIFO Count Register |
| MFCRR | R/W | Modem FIFO Control Register |
| FAR | R | FIFO A Register |
| FBR | R | FIFO B Register |
| FCR | R | FIFO C Register |
| MICR | R/W | Miscellaneous Control Register |
| ICRR | R/W | Interrupt Control Register |
| ISR | R | Interrupt Source Register |
| IER | R/W | Interrupt Enable Register |
| TR1 | R/W | Test Register #1 |
| TR2 | R/W | Test Register #2 |
| WDT1 | R | Watchdog counter (low) |
| WDT2 | R | Watchdog counter (high) |

Clock control 162 generates the clock signalling for ASIC 108, provides baud rate clocks for the modem 150, and also provides external clocks for other components. Watchdog timer 158 issues a hardware reset if not reset by software periodically. This provides a recovery mechanism in case of a catastrophic hardware or software failure. Address decode 160 provides the chip selects for various components, such as RAM 112 and flash memory 114.

Modem 150, and buffers 152 allow digital, data to be transmitted and received over an RF link. Buffer 152 transmits and receives data for the modem 150. In the preferred embodiment, buffer 152 is large enough to hold an entire frame worth of digital signalling—thus relieving RCP 102 of waiting for complete message frames (and allowing the RCP to spend more time in its low current states). Modem 150 contains conventional data transmission and reception circuitry. Briefly, modem 150 establishes bit and byte synchronization with an incoming data stream and then captures the data stream for eventual communication to RCP 102. Modem 150 also takes parallel data from RCP 102 and sends it out serially at a specified baud rate.

The receive section of modem 150 includes a digital phase-locked loop, a 16 bit shift register, a 16 bit pattern match register, and two control registers. Once modem 150 establishes bit synchronization, it provides the synchronized data to a shift register and also provides a recovered clock. The shift register (not shown) converts the received data from a serial format to a parallel format. The receiver part of modem 150 supports two basic modes of operation: normal and match. In normal operation, data bits are clocked in and passed to buffer 152 as parallel bytes as soon as sixteen valid bits of data have been received. In the match mode, modem 150 searches the incoming bit stream for a user defined pattern. Data bytes are not passed to buffer 152 until a "match pattern" is found in the data. The match pattern mode aligns data on the proper byte boundary.

Modem 150 further includes data decoding circuitry (of conventional design) which compares received data stored in the shift register with predetermined (programmed) data patterns written by RCP 102 into a pair of pattern match registers ("PMR1, PMR2") within control register bank 154. These pattern match registers comprise two 8-bit write only registers that contain the most and least significant bytes of the match pattern. In the match mode, modem 150 searches the incoming data for the pattern specified in the pattern match register. The match control register (MACR) controls the parameters (e.g., the number of bits to match, the maximum number of bits in error) associated with a match pattern. Control register bank 154 further includes a modem receive control register also writable by RCP 102. This modem receive control register (MRCR) includes, among other bits, a match enable bit that selectively enables or disables the pattern match feature. The match enable bit is automatically cleared in the preferred embodiment once a match is found.

The transmit function of modem 150 is controlled by a modem transmit control register (MTCR) within control register bank 154. This control register (which is writable by RCP 102) controls when the modem 150 begins to transmit. In order to initiate a transmit sequence, RCP 102 writes to this control register to disable the modem transmitter; then loads buffer 152 with the byte or bytes to be transmitted; and then finally re-enables the modem transmitter by again writing to the modem transmit control register. RCP 102 receives an interrupt (if enabled) when the contents of buffer 152 to be transmitted have already been sent and the buffer needs more bytes to be transmitted.

Figure 7:
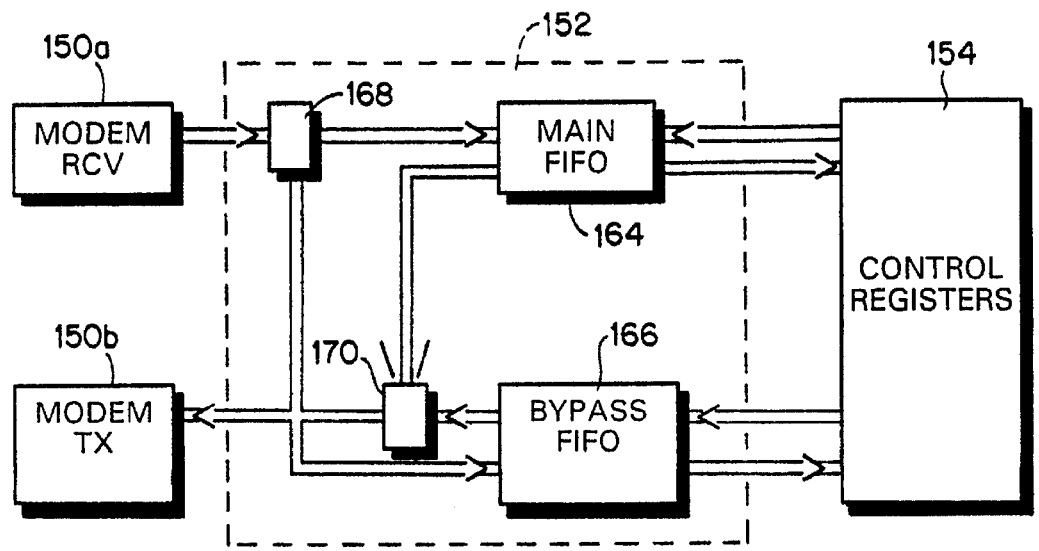
FIG. 7 is a schematic diagram of an exemplary modem, buffer and control register architecture of the FIG. 6 ASIC.

FIG. 7 is a block diagram of buffer 152 shown connected to the modem receive section 158, the modem transmit section 150B, and control registers 154. Buffer 152 includes a main FIFO buffer 164, a bypass FIFO buffer 166, and data router/multiplexers 168, 170. In the preferred embodiment, main FIFO buffer 164 comprises a static RAM array of 64 8-bit bytes, two 8-bit pointers, a 6-bit counter, and a control register. Bypass FIFO buffer 166 in the preferred embodiment is a single byte register which allows for full duplex operation.

Figure 8:
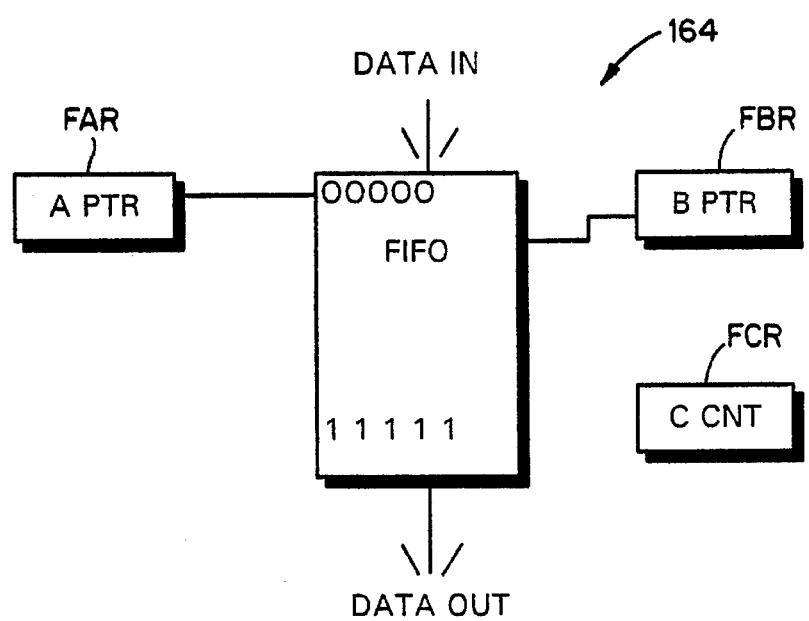
FIG. 8 is a conceptual schematic diagram showing exemplary operation of the buffer shown in FIG. 7.

FIG. 8 is a schematic illustration of the operation of main FIFO buffer 164. This main FIFO buffer 164 provides extra buffering to minimize interruptions to RCP 102. The A pointer and B pointer (FAR, FBR, respectively) each comprise 6-bit pointer/registers that are accessible by RCP 102. These pointers are used by ASIC 108 to indicate the next write and read locations respectively, within the buffer 164. The "C counter" shown in FIG. 8 controls the number of bytes to be stored within buffer 164 before ASIC 108 interrupts RCP 102. Additional registers NFTR, MFRR, MBTR, and MBRR are used to communicate data between the main FIFO buffer 164 and the bypass FIFO buffer 166, and RCP 102.

RCP 102 writes transmit data for main FIFO buffer 164 to the MFTR register. Once written, the data is immediately transferred to the location within main FIFO buffer 164 specified by the appropriate one of pointers FAR, FBR. Similarly, the MFRR register is used by RCP 102 to read data from main FIFO buffer 164. The data is transferred from the FIFO location specified by the appropriate one of pointers FAR, FBR, and loaded into the MFRR register for communication to RCP 102. Different addresses are used by RCP 102 to write to bypass FIFO 166 in the transmit direction, and to read from the bypass FIFO in the receive direction.

A modem FIFO control register (MFCRR) is also provided within control register block 154 to permit RCP 102 to control the operation of buffer 152. This modem FIFO control register includes, for example, a reset bit (which may clear the interrupt flags within the interrupt source register); a bit specifying the direction of data flow (modem 150 to RCP 102, or from RCP to the modem).

Figure 9:
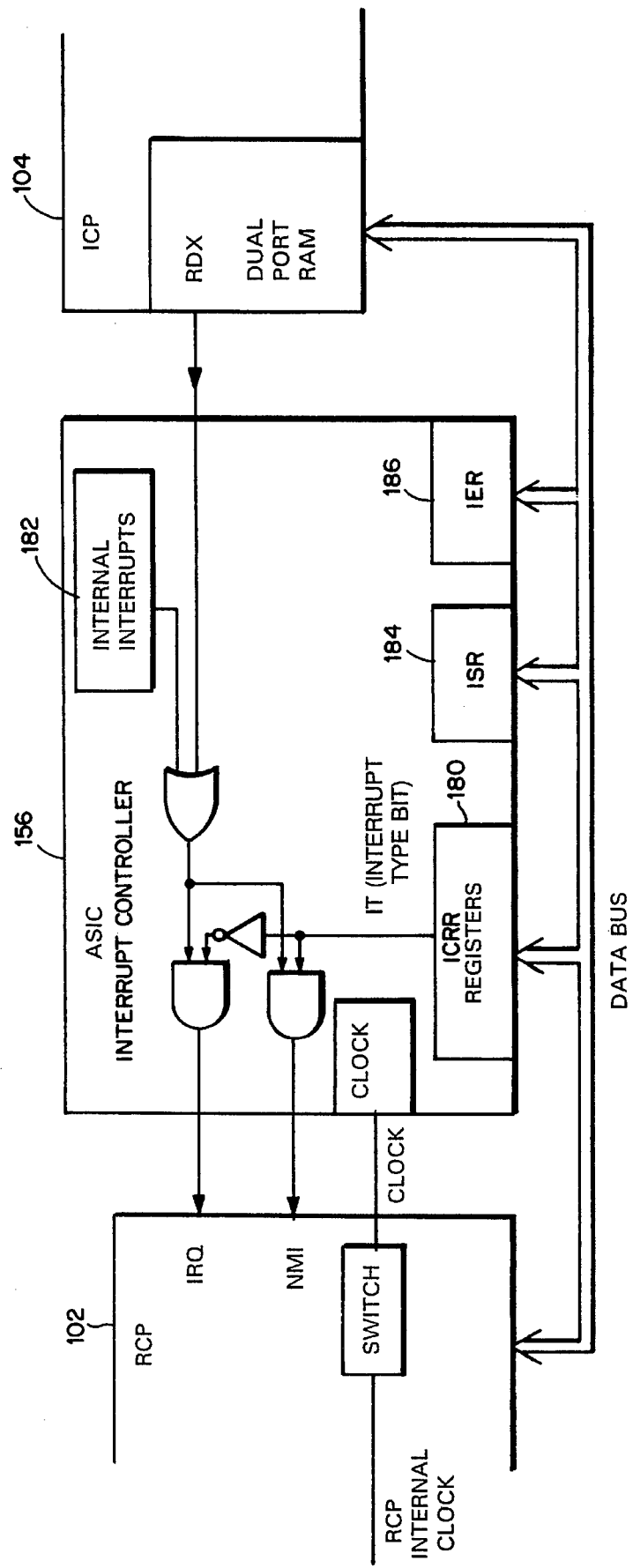
FIG. 9 is a detailed block and schematic diagram showing exemplary interrupt control structure for the FIG. 4 ASIC.
Figure 10:
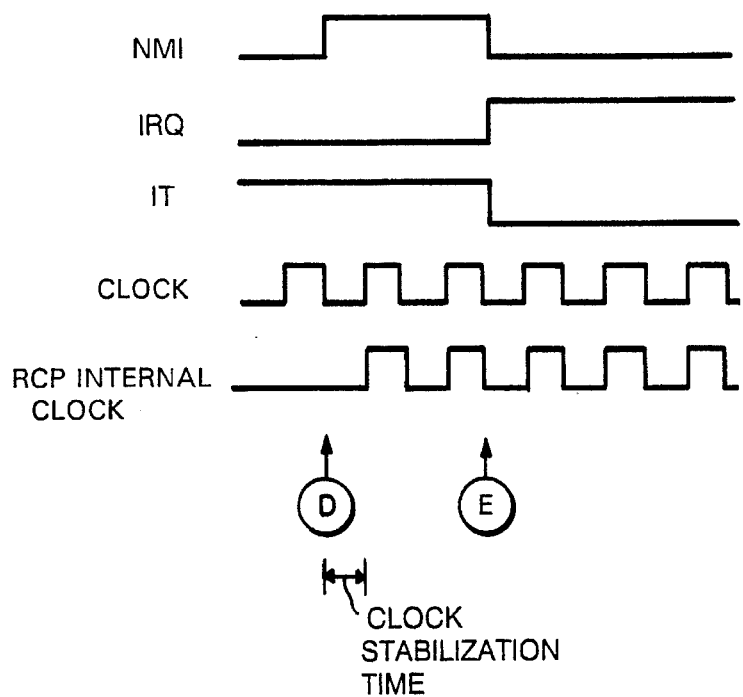
FIGS. 10–11 are timing diagrams showing exemplary wake-up and sleep sequences, respectively, of the RCP processor.

Referring now to FIGS. 6 and 9, the interrupt controller block 156 of ASIC 108 will now be described. Interrupt control section 156 coordinates all of the internal and external interrupts of ASIC 108, and also supports several external interrupt sources. Interrupt control 156 notifies RCP 102 when the various functions of ASIC 108 require attention. Interrupt control 156 can send an interrupt to one of two output pins (NMI or RIQ) allowing for different interrupt priorities as determined by RCP 102. All interrupts can be disabled and have flags which identify the source of the interrupt. Briefly, if RCP 102 is in a low power state, ASIC interrupt control 156 issues a non-maskable interrupt (NMI) to wake up RCP 102. When the RCP 102 is in its normal operating state, ASIC interrupt control 156 generates an IRQ interrupt output (applied to the IRQO input of RCP 102) to notify the RCP of an event occurring within ASIC 108. The NMI interrupt is not generated during normal operation of RCP 102 since it cannot be masked off and could effect the timing of crucial routines being executed by the RCP while it is active. Each interrupt processed by interrupt controller 156 is latched and reported in an interrupt status register. All interrupts are logically ORed into a single interrupt request line (IRQ) which interrupts RCP 102.

FIG. 9 is a high level block diagram of interrupt controller 156. An interrupt control register (ICRR) 180 includes a capture bit, an interrupt type bit, a global interrupt bit, and a reset bit. Capture bit is set by RCP 102 to prevent new interrupts from affecting the interrupt status registers. Interrupt type is specified by RCP 102 as either NMI or IRQ. The global interrupt enable bit enables or disables all ASIC 108 interrupts, while the reset bit resets all of the ASIC internal functions. FIG. 9 shows how the interrupt type bit (IT) is used to select one of the IRQ and NMI inputs of RCP 102 for application of the interrupt signal in response to ORing of interrupt sources 182 internal to ASIC 108 and/or an interrupt output generated by ICP 104.

Once RCP 102 is interrupted, it sets the capture bit of the interrupt control register (ICRR) before reading the interrupt source register (ISR). At the time the capture bit is set, the interrupt status is contained in the interrupt status register and the interrupt latches. Setting the capture bit leaves the interrupt status registers unchanged, but re-enables the interrupt latches. The capture bit also deactivates the IRQ line to RCP 102 such that any interrupts which occur while the capture bit is set or latched are not fed to the interrupt status register. This allows RCP 102 to read the interrupt status register without fear of the register contents changing after the read, but prevents new interrupts from being lost by latching them while the registers are read. Interrupt controller 156 must not lose an interrupt that occurs while the latches are being reset. Note that reading the interrupt status register clears the interrupt status bits in the preferred embodiment.

Interrupt controller 156 further includes an interrupt source register 184 and an interrupt enable register 186. Interrupt source register (ISR) 184 is an 8-bit read-only register in the preferred embodiment that indicates the source of an interrupt. The following interrupt sources may be indicated in the preferred embodiment:

| | |
|---|---|
| FM | Modem main FIFO match interrupt. This bit is set in receive/transmit mode when the number of bytes specified in match count register have been received/transmitted. |
| FR | Modem main FIFO error interrupt. This bit is set if the FIFO has an underflow or overflow. |
| FE | Modem main FIFO empty interrupt. This bit is set when the host has read all data in the FIFO. |
| BI | Modem bypass path requires service interrupt. This bit is set when the bypass FIFO requires a byte from the host to transmit or has a byte for the host to read in receive. |
| BE | Modem bypass error interrupt. This bit is set |

-continued

| | |
|---|---|
| | when the bypass underflows or overflows. |
| I1 | External interrupt 1. This bit is set when the ASIC latches an interrupt on pin EI1. |
| I2 | External interrupt 2. This bit is set when the ASIC latches an interrupt on pin EI2. |
| TS | Time sync interrupt. This bit is set on every byte shifted from the receiver once the DPLL locks. |

The interrupt enable register (IER) 186 can be written to by RCP 102 in order to allow interrupts to be generated from the various specified sources. Disabling the interrupt does not prevent the associated within ISC 184 from changing states (such that RCP 102 may poll the information instead of being interrupted by the change in state). IER 186 in the preferred embodiment permits RCP 102 to selectively enable and disable the main FIFO match interrupt, the main FIFO error interrupt, the main FIFO empty interrupt, the bypass FIFO path interrupt, the bypass FIFO error interrupt, first and second external interrupts (EI1, EI2, shown in FIG. 6), and the time sync interrupt.

Software Standby

As previously mentioned, the "software standby" feature provided by the presently preferred exemplary embodiment of the present invention utilizes the interrupts provided by ASIC interrupt control 156 in order to reduce the power consumed by radio main unit 52. The manner in which RCP 102 enters and exits the "software standby" mode will now be described in connection with FIGS. 10–13.

As mentioned above, it is desirable to have RCP 102 operate in as low a power state as possible for as long as possible. But when the CPU power of RCP 102 is needed, the RCP must return to normal operation quickly and efficiently and then return to the low power state in a similar manner.

The Hitachi H8/532 is designed to provide two software-initiated "power down." states (i.e., states in which some or all of the internal clock signals are stopped to conserve power). Those two states are: "sleep mode"; and "software standby mode" See pages 70–77 and page 307 et seq of the above-referenced Hitachi H8/532 manual. The sleep mode and the software standby mode are entered from the program execution state by executing the SLEEP software instruction. In the "sleep" mode, the CPU halts but the rest of the chip (including on-chip supporting modules and the internal watchdog timer) remain active and the clock remains running. In the SSB mode, the entire chip (including on-chip supporting modules) are halted and partly initialized, and the chip's clock is halted. In both the SSB and sleep modes, the internal register and on-chip RAM contents of RCP 102 are held and chip I/O outputs remain in their current states. RCP 102 exits the sleep mode in response to an active signal being applied to its maskable (IRQ) interrupt input. RCP 102 exits the SSB mode in response to receipt of an NMI (non-maskable) interrupt. See Chapter 18 of the above-referenced Hitachi H8/532 manual.

Figure 12:
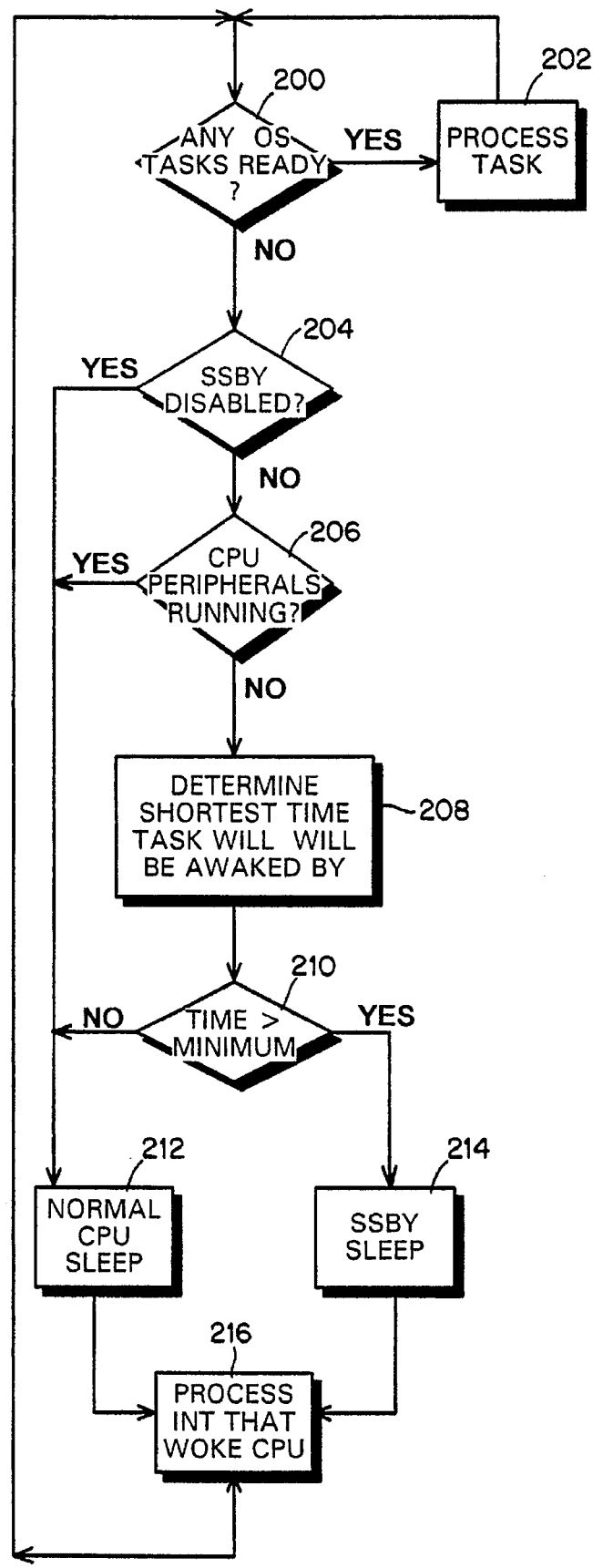
FIG. 12 is a schematic flowchart of exemplary operating system control steps performed by the RCP processor shown in FIG. 4.

FIG. 12 is a flowchart of exemplary program control steps performed by RCP 102 as part of its operating system scheduling mode to determine whether or not to enter a low power mode. RCP 102 determines whether it has any operating system tasks that are ready to process immediately (decision block 200). If so, then all such tasks are processed (block 202). If there are no such tasks ready to be immediately processed ("no" output of decision block 200), then RCP 102 determines whether the software standby mode has been disabled (i.e., by increment of a disable counter) (decision block 204). If the SSB mode has been so disabled, then subsequent steps 206–210 are bypassed and RCP 102 enters the sleep mode (block 212).

If, on the other hand, the capability of entering the SSB mode is currently enabled ("N" output of decision block 204), then RCP 102 determines whether the software is currently using any external peripherals such as UARTs, timers or counters (with the exception of ASIC 108 and the FRT1 system timer) (decision block 206). If such external peripherals are in use, RCP 102 enters the sleep mode instead of SSB mode in order to avoid shutting down such peripherals (blocks 206, 212).

Assuming that no external peripherals are running ("N" output of decision block 206), then RCP 102 looks at all the system timeout timers for each task in the operating system to determine the shortest time before a task will be awakened (block 208). In the preferred embodiment, the RCP 102 operating system is event driven such that many events are triggered by timer time-out (i.e., a certain real time being reached). The operating system maintains a plurality of such system timeout timers. When one of the timers times out, the operating system is notified (e.g., via an interrupt) such that it can run the associated task. The operating system may thus schedule tasks to be run at particular times (or after predetermined time periods have elapsed). In the preferred embodiment, a certain amount of time (overhead) is required to cause RCP 102 to enter and exit the SSB mode. To prevent such time overhead from disrupting operating system time scheduling and to ensure that all scheduled tasks are timely executed, preferred embodiment RCP 102 determines whether the time before the next scheduled task must begin executing is less than a minimum predetermined delta time (decision block 210). If the next scheduled task time is less than the minimum delta ("N" output of decision block 210), then RCP 102 enters the sleep mode (block 212) instead of the SSB mode. On the other hand, if all of the conditions imposed by decision blocks 204, 206, 212 are satisfied, then RCP 102 enters the SSB mode (block 214).

Figure 13:
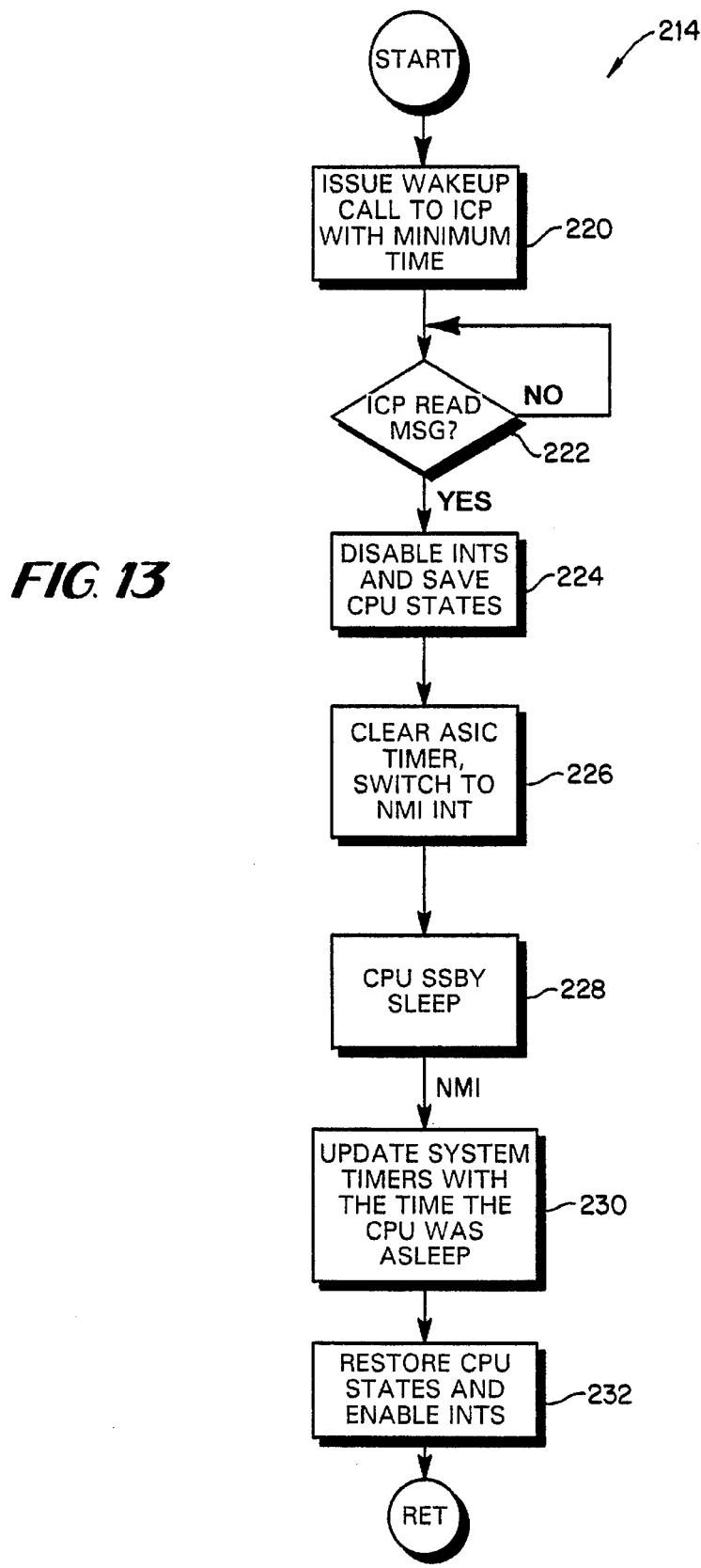
FIG. 13 is a schematic flowchart of exemplary program control steps performed by the FIG. 4 RCP processor upon being "awakened" by the ASIC.

FIG. 13 is a flowchart of exemplary program control steps performed by RCP 102 as part of processing the FIG. 12 "SSB SLEEP" block 214 prior to entering the SSB low power mode. RCP 102 first issues a wakeup call request to ICP 104 (block 220). In a manner somewhat analogous to the way a businessperson can ask a hotel front desk to provide a wakeup call in time for her to shower and dress so she won't be late for a breakfast meeting, RCP 102 requests ICP 104 (via a message sent to the ICP dual port RAM) to issue a "wakeup call" (in the form of an NMI interrupt request via AISC 108) so as to "wake up" the RCP in time to execute the next scheduled operating system task (this wakeup time already having been calculated by block 208 and being decreased to take into account the additional overhead time required for RCP to wake up). This wakeup is used, to insure that RCP 102 will wake up before a task needs to run. In the preferred embodiment, RCP 102 waits until it receives confirmation that ICP 104 has actually read the message (decision block 222) before proceeding.

RCP 102 then disables all RCP interrupts except NMI (this interrupt input cannot be disabled by the RCP but only by ASIC 108 in the preferred embodiment) (block 224). RCP 102 also saves the state of all peripherals that will be reset in response to the NMI interrupt (block 224). RCP 102 then "pets" the ASIC watchdog timer 158 in order to clear it, and sends a message to ASIC interrupt control register ICRR (discussed above) to set the interrupt type to NMI (block 226). RCP 102 then executes the SLEEP instruction so as to enter the SSB mode (block 228). RCP 102 remains in this SSB mode until it receives an NMI interrupt from ASIC 108.

Figure 11:
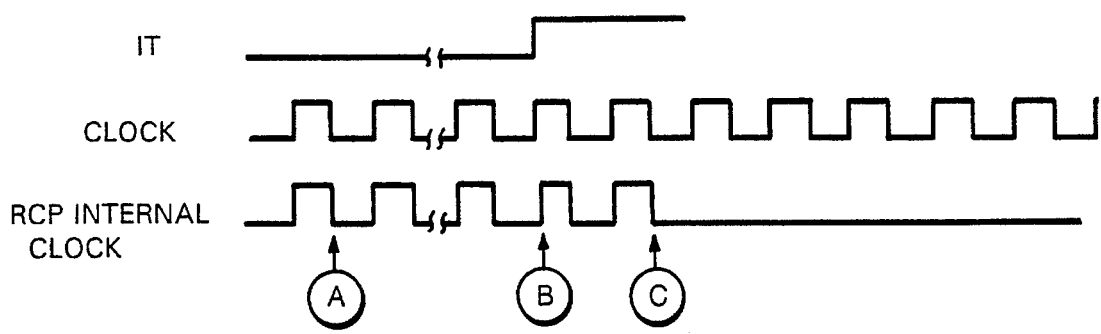

Referring briefly to FIG. 11 (a timing diagram showing exemplary clock timing signals existing with respect to RCP 102 during the process of entering the SSB mode), the RCP internal clock edge labelled "A" corresponds to the time when RCP 102 is performing the routine shown in FIG. 12. The FIG. 11 clock edge labelled "B" occurs at the time of executing FIG. 13 block 226, and the FIG. 11 clock edge labelled "C" occurs at the time of executing FIG. 13 block 228 (thereby causing the internal RCP clock to stop). Referring to the FIG. 10 diagram of exemplary "wake up" timing signals, upon receiving an NMI interrupt RCP 102 "wakes up" (label "D"). The internal RCP 102 clock must stabilize before an instruction can be executed. At the clock edge labelled "E" RCP 102 begins executing a wakeup interrupt routine shown at FIG. 13 blocks 230, 232.

Referring again to FIG. 13, RCP 102 switches ASIC 108 back to the "IRQ" interrupt mode (part of block 230). This has the effect of removing the NMI interrupt but, in the preferred embodiment, also forces a pending IRQ interrupt which will be processed as described below (such an IRQ interrupt can also happen during execution of blocks 226, 228 to prevent the RCP from entering the SSB mode). RCP 102 then proceeds to calculate the amount of time (if any) that the RCP was asleep by reading (and then "pets" the ASIC 108 watchdog timer 158 (block 230). Note that in the preferred embodiment the system clock signal is continuously applied to RCP 102. Since RCP 102 actually stops the clock signal within the RCP chip in the SSB mode, all of the RCP software timers also stop timing (but retain their values at the time the RCP went into the SSB mode). In the preferred embodiment, RCP 102 adds the contents of the ASIC 108 watchdog timer 158 to the contents of each of its software timers in order to compensate for the amount of time the processor was asleep (block 230). RCP 102 then restores the state of all peripherals that were saved in block 224, and finally enables all (e.g., the maskable IRQ) interrupts (block 232). Such enabling of interrupts will cause an immediate IRQ0 interrupt (the pending NMI interrupt) to allow the RCP 102 to determine the source of the interrupt (e.g., a wakeup from ICP 102, received data contained in ASIC buffer 152, etc.) from the interrupt control related registers within ASIC 108 control register bank 154. Such interrupt is handled as required, depending upon its source.

ICP 104 Channel Guard Decode

In the preferred embodiment, the timer capture feature of ICP 104 is used to allow simultaneously decode of conventional T99 and channel guard signalling. Prior implementations of the tone channel guard decode algorithm have sampled the signal to determine the negative edges. Such prior sampling techniques thus required two separate processors (one for T99, the other for channel guard) since both decodes were based on software sampling. Thus, the prior approach required a great deal of processing time and prevented a single processor from performing both tone decodes. Such sampling must be done at exact times, and a single processor would thus have to wait to sample one tone until the other tone sampling process is completed. Since it is possible for T99 and channel guard tone edges to occurred at or near the same time, interference can occur between the two decode processes. Such interference degrades the performance of the decoders.

Preferred embodiment ICP 104, in contrast, uses the timer capture feature of the H8/330's free running timer to eliminate the interference between the two tone decode processes. The timer is programmed to save the exact time a channel guard transition occurs and then generate an interrupt. The channel guard routine responds to the interrupt, and obtains the time between the negative edges of the signal from the saved timer time. This permits ICP 104 to calculate the time between transitions and feed this information into the decoder. Knowing the time between transitions is the same information provided by sampling, so a prior art tone decode algorithm can be adapted to determine whether the tone being received is channel guard of a specified frequency. The timer capture routine is independent of the hardware used to sample T99 tones, so that the timer can be run at the same time the T99 software decode routine is sampling. Since the timer saves the exact time of a channel guard transition, the channel guard software can wait for T99 sampling to complete before it runs (e.g., by temporarily disabling interrupts while sampling T99). This eliminates interference and allows the ICP 104 to perform both T99 tone decode (using a conventional sampling approach) and channel guard decode (using timer capture) simultaneously. Thus, RCP 102 does not need to perform these functions and no other processor or other hardware need be provided either. This allows RCP 102 to sleep more, and simplifies the architecture, reduces parts count and reduces cost and power consumption.

Figure 14A:
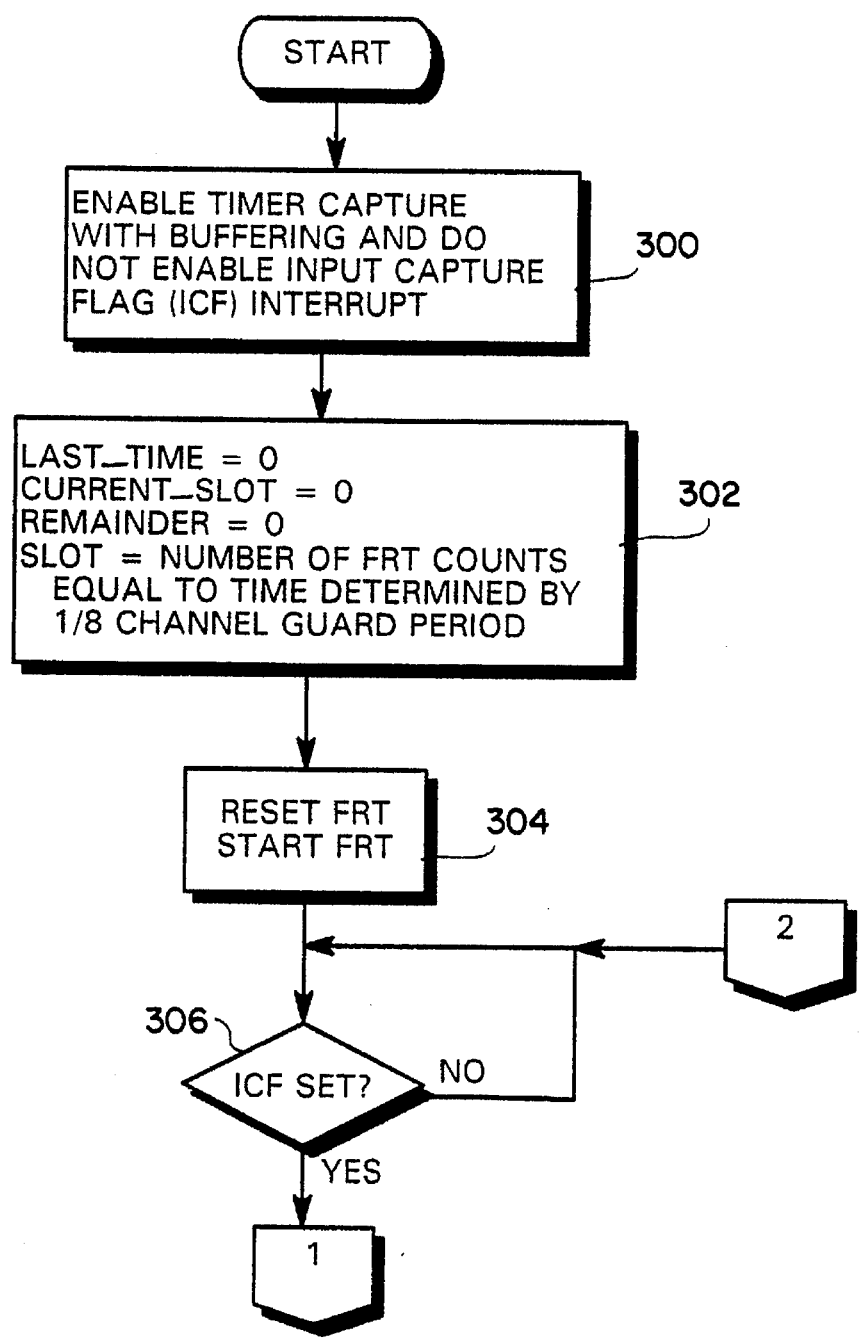
FIGS. 14A–14B together are schematic flowcharts of exemplary program control steps performed by the FIG. 4 low-power ICP processor in order to provide channel guard decode using a free running timer.

An exemplary channel guard tone decode routine will now be described in connection with FIGS. 14A–14B and 15. As mentioned above, ICP 104 in the preferred embodiment provides a free running timer that captures the timer's value on the bit transition (e.g., the rising or falling edge) of the channel guard signal. To begin channel guard decode, ICP 104 enables this timer capture with buffering, but in the preferred embodiment does not enable the input capture flag interrupt (ICF) provided by the H8/330 (FIG. 14A block 300). In an alternate implementation, the input capture flag interrupts is enabled, and interrupts generated due to detection of channel guard transitions are mapped to a low priority interrupt (so as to avoid interfering with real time processing of T99 signalling). ICP 104 then initializes variable as shown in block 302, resets and starts the free running timer (FRT) (block 304), and waits for notification that a transition has occurred (e.g., as indicated by an interrupt).

Figure 14B:
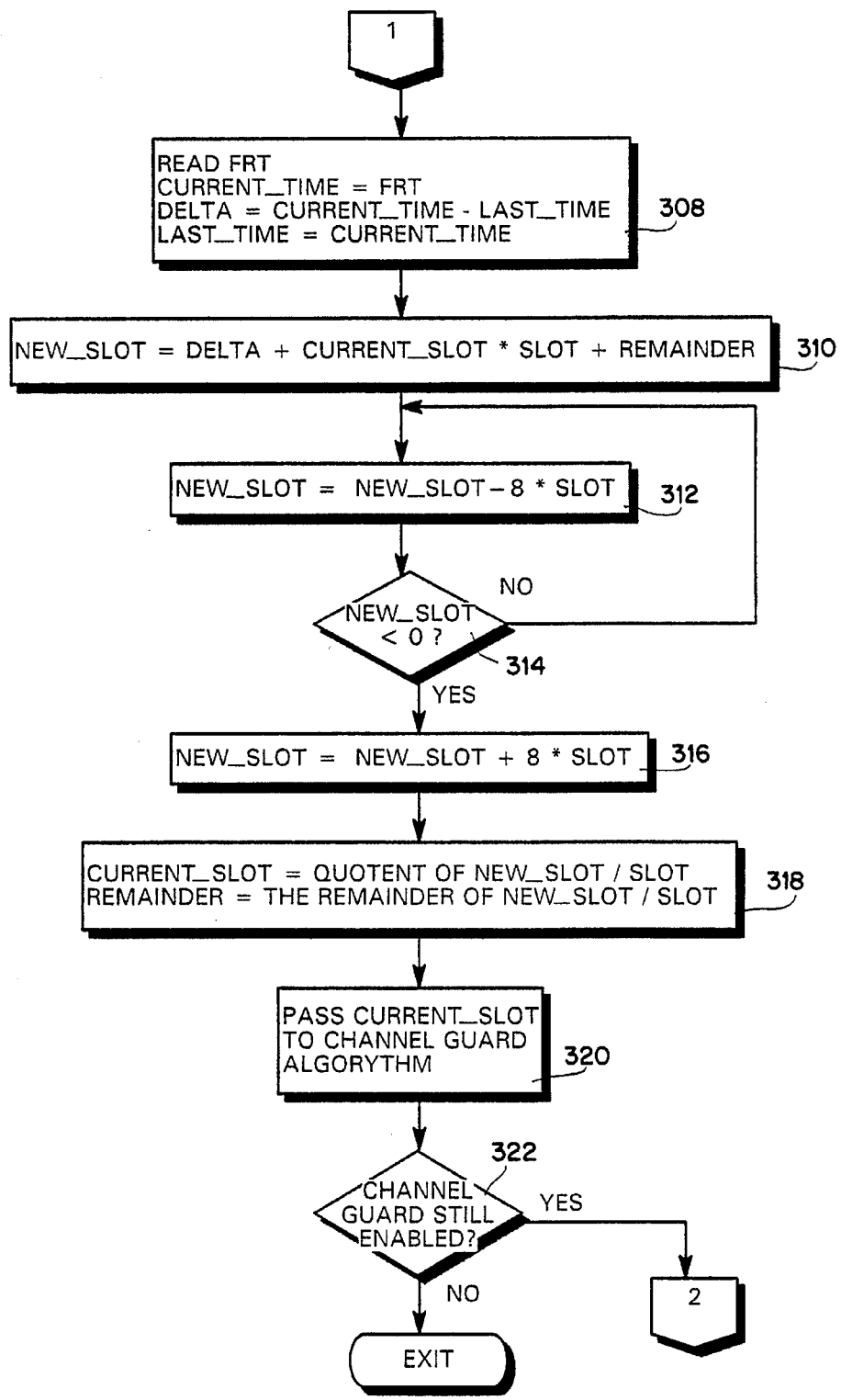
Figure 15:
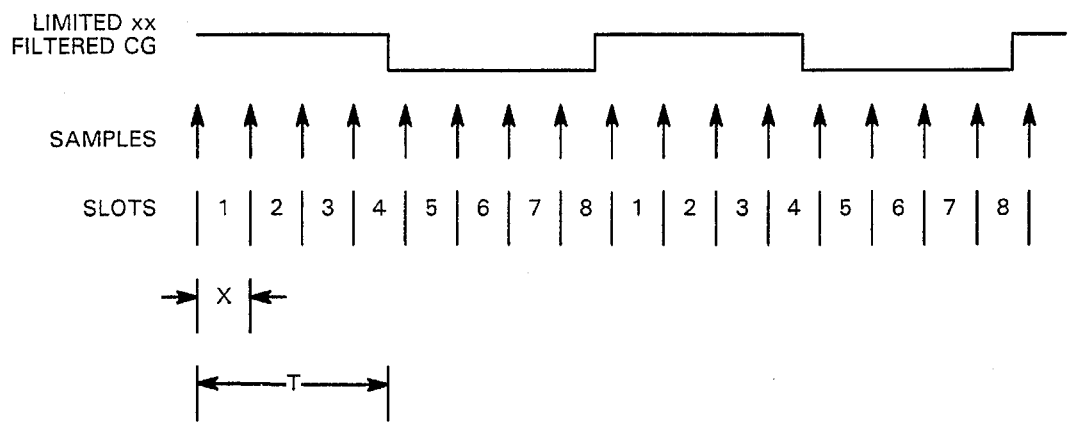
FIG. 15 is an exemplary timing diagram showing the exemplary channel guard detection technique performed by the FIG. 4 ICP processor.

FIG. 14B shows exemplary program control steps performed when a transition has occurred. ICP 104 reads the buffered (captured) value from the free running timer and calculates the time between the present channel guard transition and the last (stored) channel guard transition (block 30, FIG. 14B). This time interval is then converted to (categorized as falling within) one of 8 "buckets" (blocks 312–318). Referring to the FIG. 15 timing diagram, this time is calculated as:

SLOT=[(T/X) (rounded to the next integer)] mod 8.
(where X is the duration between "samples" (in this case a fixed time period dependent on the channel guard frequency to be detected), and T is the time between the present and the last transition as calculated from the value obtained from the free running timer. Briefly, ICP 104 calculates which "bucket" or slot contains the negative edge (blocks 312–318). An indication of this "bucket" or "slot" is provided to the conventional channel guard decode algorithm (block 320), and the interrupt handler then returns to await further channel guard transitions so long as channel guard decode is still enabled (decision block 322, FIG. 14A block 306).

In executing the conventional channel guard decode algorithm, ICP 104 generates a vector from the information provided by block 320 and sums the vector with the previous vector. The magnitude of the new resultant vector is compared to the appropriate threshold. The conventional algorithm also dampens the vector by $15/16$ once a period of the desired tone. If the vector magnitude is greater than the appropriate detect threshold, ICP 104 sends RCP 102 a "CG RESPONSE" message indicating "CG detected". Once tone channel guard has been so detected, the vector magnitude is compared to the appropriate drop threshold value. If the magnitude is less than the detect threshold, ICP 104 sends the "CG RESPONSE" message to RCP 102 indicating "CG not detected".

ICP Synthesizer Lock Monitoring

In the preferred embodiment, frequency synthesizer 117 (which is used to control the transmit and receive radio frequencies of main unit 52) is controlled and monitored by ICP 104. The synthesizer 117 is loaded via a simple serial link. Data provided over a data line (see FIG. 16) is clocked into a shift register within the synthesizer 117 by a clock line controlled by ICP 104 via a clock line (not shown). The data in the shift register is loaded into the synthesizer once a strobe enable is issued (see FIG. 16). A WIDE or NARROW signal selects the synthesizer bandwidth.

Figure 16:
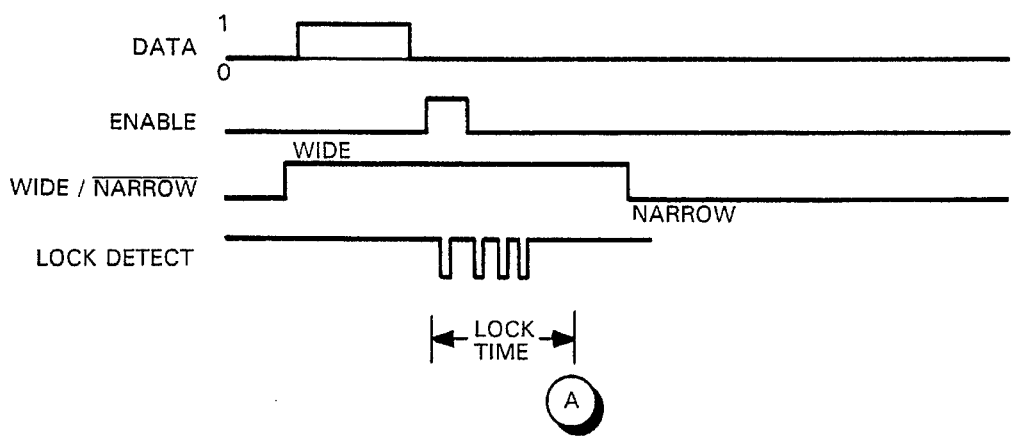
FIG. 16 is an exemplary timing diagram showing the synthesizer lock detect performed by the low-power ICP processor shown in FIG. 4.

In the preferred embodiment, synthesizer provides a LOCK output indicating whether or not it is locked on frequency (see FIG. 16). A constant "1" output on this line indicates that the frequency synthesizer 117 is locked. Pulses on this LOCK line indicate that the synthesizer is unlocked. ICP 104 monitors a LOCK output line to determine whether the synthesizer 117 remains locked on frequency, and reports to RCP 102 (via an interrupt) if the synthesizer is unlocked.

FIG. 16 is a timing diagram of exemplary signals between ICP 104 and synthesizer 117 in the preferred embodiment for programming the synthesizer with a new frequency. ICP 104 sets the WIDE/NARROW line to WIDE (thereby ensuring rapid response) and serially loads the new frequency information (in digital form) into the synthesizer 117 via the DATA line. ICP 104 then issues the ENABLE signal to start the frequency change. Note that the lock detect line begins to pulse (indicating that the synthesizer has become unlocked). ICP 104 waits a predetermined LOCK TIME (until time "A" as show in FIG. 16) to give the synthesizer time to lock, and then samples the LOCK line. If LOCK DETECT=1, then ICP 104 reports to RCP 102 (via a dual port RAM message) that the synthesizer has locked. If any pulse is detected on the LOCK line after point "A", ICP 104 reports the unlocked condition to RCP 102.

Serial Port Sharing

Figure 17:
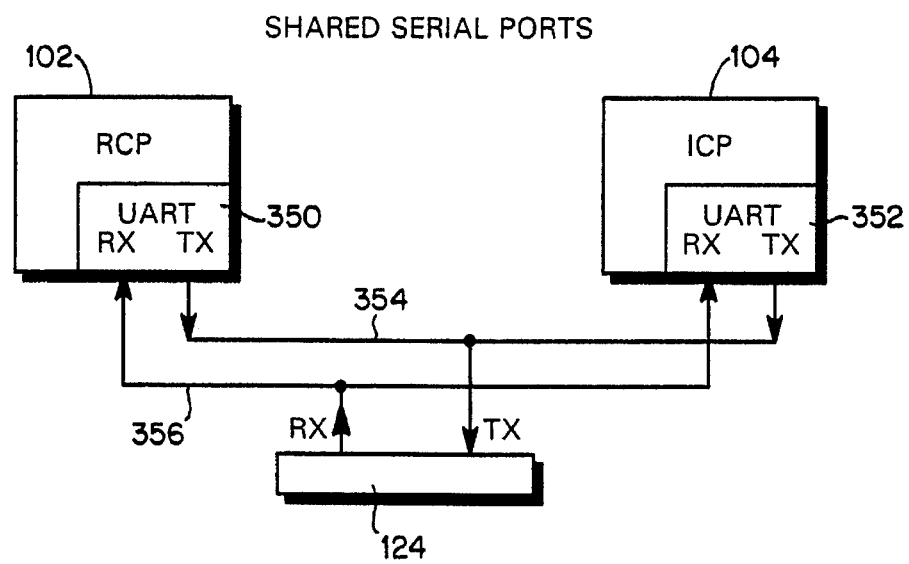
FIG. 17 is a high level block diagram showing an exemplary serial port sharing arrangement between the high-power and low-power processors RCP and ICP shown in FIG. 4.

FIG. 17 is a schematic diagram of the manner in which RCP 102 and ICP 104 share serial ports to connect to universal device connector 124 in the preferred embodiment. RCP 102 includes a conventional internal bidirectional tristatable UART 350, and ICP 104 similarly includes a conventional tristatable UART 352. In the preferred embodiment, the transmit outputs of UARTs 350, 352 are connected together (via line 354) and to an appropriate pin(s) of UDC 124; and similarly, the receive inputs of UARTS 350, 352 are connected together (via line 356) and to an appropriate pin(s) of UDC 124. In the preferred embodiment, the input and output of RCP UART 350 is normally in the tristate (inactive) condition, and the input/output of ICP UART 352 is normally in the active (non-tristate) condition. ICP 104 is programmed to detect serial data on input line 356. If ICP 104 detects serial data is present, it sends an interrupt to RCP 102 notifying the RCP of same. ICP 104 does not attempt to decode the data, but rather simply acts as a detector for the presence of data. ICP 104 provides the first message (received before RCP 102 was listening to the serial data) to RCP 102 via the ICP's dual port RAM. After receiving the first message, RCP 102 sends a message to ICP 104 that disables the ICP UART 352 input/output and then activates its own (RCP) UART 350 input/output. RCP 102 may then receive and decode the remainder of the incoming data. In this way, RCP 102 may sleep, since ICP 104 can be depended on to wake up the RCP when data appears on the serial data input line.

An extremely compact, full featured portable radio architecture has been described that conserves power by allowing a processor to sleep except when it needs to perform tasks. The preferred architecture provides a lower power processor which acts principally as an interrupt controller but which performs other functions as well (e.g., tone decode, synthesizer lock monitoring, etc.) such that the main processor can sleep as much as possible and yet is assured of being awoken promptly when its processing power is required. The resulting portable radio has extremely low power consumption (e.g., only on the order of 75 milliamperes during trunked mode operation while locked onto the trunking control channel)—thereby permitting even a relatively small battery pack (the 1200 ma battery pack provides a total radio weight of less than 20 ounces) to provide 7.3 hours of continuous operation (which is most of an 8 hour shift) using the industry standard "5-5-90" rating for continuous radio operation. Using a low transmit power option should permit this radio configuration to exceed 8 hours of continuous "5-5-90" operation. Thus, the portable radio with battery is small and lightweight enough to fit into a front shirt pocket.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery powered portable radio transceiver comprising:

a housing;

an antenna mounted on said housing;

radio frequency circuitry, disposed within said housing and coupled to said antenna, for transceiving radio frequency signals over the air via said antenna, said radio frequency circuitry transmitting and receiving voice and data communications via an RF working channel and monitoring control signals on an RF control channel;

a processing device disposed within said housing, said processing device being switchable between an active mode and a software standby mode, said processing device performing tasks associated with said transceiving when in said active mode;

a controller, disposed within said housing, coupled to said radio frequency circuitry and connected to said processing device, said controller monitoring the RF control channel while the processing device is in the software standby mode and controlling said processing device to switch from said software standby mode to said active mode in response to at least one event associated with said transceiving; and a battery removably coupled to said housing, said battery supplying power to said radio frequency circuitry, said processing device, and said controller, wherein said housing including said radio frequency circuitry, processing device, and controller weighs about ten ounces or less, is not more than substantially four inches in length, and wherein current consumption is minimized in said standby mode.

2. A transceiver as in claim 1 wherein:

said transceiver further includes a clock generator that continuously applies a clock signal to said processing device; and said controller does not disconnect said clock signal from said processing device in order to switch said processing device to said software standby mode.

3. A transceiver as in claim 1 wherein said radio frequency circuitry is for transmitting voice and data via both a trunked radio channel and a conventional non-trunked radio channel.

4. The transceiver in claim 1, wherein current is minimized to permit typical operation of said radio transceiver for at least a six hour shift without replacement of said battery.

5. A battery powered portable radio transceiver comprising:

a housing;

an antenna mounted on said housing;

radio frequency circuitry, disposed within said housing and coupled to said antenna, for transceiving radio frequency signals over the air via said antenna, said radio frequency circuitry transmitting and receiving voice and data communications via an RF working channel and monitoring control signals on an RF control channel;

a first programmable processing device disposed within said housing, said first programmable processing device having a first program store connected thereto, said first program store storing first program instructions, said first processing device having an active mode and a software standby mode, said first processing device executing said first program instructions to perform tasks associated with said transceiving when in said active mode;

a second processing device, disposed within said housing, coupled to said radio frequency circuitry and connected to said first programmable processing device, said second processing device monitoring the RF control channel in the software standby made and to control said first programmable processing device to switch from said software standby mode to said active mode in response to at least one event associated with said transceiving; and a battery removably coupled to said housing, said battery supplying power to said radio frequency circuitry, said first programmable processing device, and said second processing device, wherein said transceiver draws reduced current from said battery during the software standby mode as compared with current drawn from said battery in the active mode.

6. A transceiver as in claim 5 wherein said second processing device executes a tone decoding software program routine for detecting received signalling tones.

7. A transceiver as in claim 5 wherein:

said transceiver further includes a clock generator that continuously applies a clock signal to said first programmable processing device; and said second processing device does not disconnect said clock signal from said first programmable processing device in order to switch said first processing device to said software standby mode.

8. A transceiver as in claim 5 wherein said radio frequency circuitry is for transmitting voice and data via both a trunked radio channel and a conventional non-trunked radio channel.

9. A radio transceiver comprising:

radio frequency circuitry for transceiving radio frequency signals over the air;

a processing device having first and second interrupt inputs, said processing device having an active state and a reduced power state, said processing device switching from said reduced power state to said active state in response to receipt of an interrupt signal received on said first interrupt input, said processing device performing at least one operation associated with said transceiving when in said active state, said processing device interrupting said operation and responding to an interrupt signal received on said second interrupt input when operating in said active state, said processing device sending a signal specifying whether a next interrupt signal should be applied to said first interrupt input or to said second interrupt input; and an interrupt controller coupled to said radio frequency circuitry and connected to said first and second interrupt inputs, said interrupt controller receiving said specifying signal from said processing device, said interrupt controller responding to at least one event associated with said transceiving by applying an interrupt signal to said processing device, said interrupt controller applying said interrupt signal to first interrupt input or to said second interrupt input based on said received specifying signal.

10. A radio transceiver as in claim 9 wherein said first interrupt input is non-maskable.

11. A radio transceiver as in claim 9 wherein said transceiver further includes:

a serial port coupled to said processing device; and a further processing device also coupled to said serial port, said further processing device detecting incoming data on said serial port and informing said first-mentioned processing device of the results of detection.

12. A radio transceiver as in claim 11 wherein said further processing device is coupled to said interrupt controller and causes said interrupt controller to generate said interrupt signal in response to said incoming data detection.

13. A radio transceiver as in claim 9, further including:

means coupled to said processing device for automatically determining a parameter associated with the configuration of said transceiver.

14. A radio transceiver as in claim 13 wherein said parameter determining means includes an analog-to-digital converter connected to a voltage divider.

15. A radio transceiver as in claim 9, wherein said interrupt controller provides at least one time related parameter, and said processing device uses said time related parameter to update at least one timing parameter associated with said processing device upon switching from said reduced power state to said active state.

16. A radio transceiver comprising:

radio frequency circuitry for transceiving radio frequency signals over the air;

a processing device having first and second interrupt inputs, said processing device switching between an active state and a reduced power state in response to receipt of a first interrupt signal applied to said first interrupt input, said processing device responding to a second interrupt signal received on said second interrupt input when operating in said active state; and an interrupt controller coupled to said radio frequency circuitry and connected to said processing device first and second interrupt inputs, said interrupt controller selectively applying said first interrupt signal to said processing device first interrupt input depending on said state of said processing device in response to at least one event associated with said transceiving, wherein said interrupt controller applies said first interrupt signal to said first interrupt input when said processing device operates in said reduced power state, and applies said second interrupt signal to said second interrupt input during operation of said processing device in said active state.

17. A radio transceiver comprising:

radio frequency circuitry for transceiving radio frequency signals over the air;

a processing device having first and second interrupt inputs, said processing device switching between an active state and a reduced power state in response to receipt of a first interrupt signal applied to said first interrupt input, said processing device responding to a second interrupt signal received on said second interrupt input when operating in said active state; and an interrupt controller coupled to said radio frequency circuitry and connected to said processing device first and second interrupt inputs, said interrupt controller selectively applying said first interrupt signal to said processing device first interrupt input depending on said state of said processing device in response to at least one event associated with said transceiving, wherein said transceiver further includes:

a frequency synthesizer having an output connected to said radio frequency circuitry, said output controlling the operating frequency of said transceiving, and a further processing device coupled to said radio frequency circuitry, said further processing device detecting when said frequency synthesizer output is unstable and informing said first-mentioned processing device of the results of detection.

18. A radio transceiver as in claim 17 wherein said further processing device prompts said interrupt controller to generate said second interrupt signal in response to detection that said frequency synthesizer output is unstable.

19. A radio transceiver comprising:

radio frequency circuitry for transceiving radio frequency signals over the air;

a processing device having first and second interrupt inputs, said processing device switching between an active state and a reduced power state in response to receipt of a first interrupt signal applied to said first interrupt input, said processing device responding to a second interrupt signal received on said second interrupt input when operating in said active state; and an interrupt controller coupled to said radio frequency circuitry and connected to said processing device first and second interrupt inputs, said interrupt controller selectively applying said first interrupt signal to said processing device first interrupt input depending on said state of said processing device in response to at least one event associated with said transceiving, wherein said transceiver further includes:

a further processing device coupled to said radio frequency circuitry and to said interrupt controller; and a shared memory for communicating messages bidirectionally between said first-mentioned processing device and said further processing device via said interrupt controller.

20. A radio transceiver as in claim 19 wherein said shared memory comprises a dual port random access memory located in said further processing device.

21. A radio transceiver comprising:

radio frequency circuitry for transceiving radio frequency signals over the air via an antenna on RF channels;

a first processing device programmable with a high level programming language and having a first program memory storing first high level program instructions, said first processing device being capable of switching between an active state and a reduced power software standby state in response to receipt of an interrupt signal, said first processing device executing said first high level program instructions; and a second programmable processing device coupled to said radio frequency circuitry and said first processing device, said second programmable processing device having a second program memory storing second program instructions, said second programmable processing device executing said second program instructions to monitor control signals on one of the RF channels in the software standby state and to control said first processing device to switch from said software standby state to said active state in response to at least one transceiving event by generating the interrupt signal;

said transceiver being powered by a battery, said transceiver and battery together weighing less than twenty ounces and being small enough to fit into a front shirt pocket of a user of the radio transceiver.

22. A radio transceiver comprising:

radio frequency circuitry for transceiving radio frequency signals over the air;

a processing device having first and second interrupt inputs, said processing device switching between an active state and a reduced power state in response to receipt of a first interrupt signal applied to said first interrupt input, said processing device responding to a second interrupt signal received on said second interrupt input when operating in said active state; and an interrupt controller coupled to said radio frequency circuitry and connected to said processing device first and second interrupt inputs, said interrupt controller selectively applying said first interrupt signal to said processing device first interrupt input depending on said state of said processing device in response to at least one event associated with said transceiving, wherein said transceiver further includes a further programmable processing device coupled to said radio frequency circuitry, said programmable processing device executing stored instructions to simultaneously detect first and second different received tone signalling and inform said processing device of results of detection.

23. A radio transceiver comprising:

radio frequency circuitry for transceiving radio frequency signals over the air;

a processing device having first and second interrupt inputs, said processing device switching between an active state and a reduced power state in response to receipt of a first interrupt signal applied to said first, interrupt input, said processing device responding to a second interrupt signal received on said second interrupt input when operating in said active state; and an interrupt controller coupled to said radio frequency circuitry and connected to said processing device first and second interrupt inputs, said interrupt controller selectively applying said first interrupt signal to said processing device first interrupt input depending on said state of said processing device in response to at least one event associated with said transceiving, wherein said transceiver further includes a software programmable processing device coupled to said radio frequency circuitry, said software programmable processing device executing stored instructions to simultaneously detect channel guard and T99 received tone signalling and inform said processing device of the results of detection.

24. A radio transceiver comprising:

radio frequency circuitry for transceiving radio frequency signals over the air;

a processing device having first and second interrupt inputs, said processing device switching between an active state and a reduced power state in response to receipt of a first interrupt signal applied to said first interrupt input, said processing device responding to a second interrupt signal received on said second interrupt input when operating in said active state; and an interrupt controller coupled to said radio frequency circuitry and connected to said processing device first and second interrupt inputs, said interrupt controller selectively applying said first interrupt signal to said processing device first interrupt input depending on said state of said processing device in response to at least one event associated with said transceiving, wherein said transceiver further includes:

a display having a backlight; and pulse width modulating means coupled to said backlight for applying, to said backlight, a signal having a programmable duty cycle, wherein said duty cycle is increased or decreased depending on whether said processing device is in said active or reduced power state.

25. A radio transceiver comprising:

radio frequency circuitry for transceiving radio frequency signals over the air;

a processing device having first and second interrupt inputs, said processing device of switching between an active state and a reduced power state in response to receipt of a first interrupt signal applied to said first interrupt input, said processing device responding to a second interrupt signal received on said second interrupt input when operating in said active state; and an interrupt controller coupled to said radio frequency circuitry and connected to said processing device first and second interrupt inputs, said interrupt controller selectively applying said first interrupt signal to said processing device first interrupt input depending on said state of said processing device in response to at least one event associated with said transceiving, wherein said transceiver passes digital signals over a radio frequency channel, and further includes a data buffer coupled to said radio frequency circuitry and to said interrupt controller, said data buffer temporarily storing said digital signals, said interrupt controller generating an interrupt signal in response to a parameter related to the contents of said buffer.

26. A radio transceiver as in claim 25 wherein said parameter indicates whether said buffer is full.

27. A radio transceiver as in claim 25 wherein said parameter indicates whether said buffer is empty.

28. A radio transceiver as in claim 25 wherein said parameter indicates whether said buffer contains data that matches predetermined data.

29. A radio transceiver as in claim 25 wherein said parameter indicates whether said buffer contains a complete frame of data.

30. A radio transceiver comprising:

radio frequency circuitry for receiving and transmitting radio frequency signals;

a clock signal generator that generates a clock signal;

a first computing device including an arrangement that controls said first computing device to switch between an active state and a reduced power state in response to a control signal, said first computing device being connected to receive said clock signal generated by said clock signal generator;

a second computing device coupled to the radio frequency circuitry, performing at least one task related to said receiving and transmitting while said first computing device is in said reduced power state; and control logic circuitry connected to said first and second processing devices and responsive to a signal from the second computing device for applying said control signal to said first computing device so as to cause said first computing device to begin operating in said active state.

31. The radio transceiver of claim 30, wherein said control logic circuitry permits said clock signal to continue to be applied to said first computing device.

32. Within a radio transceiver having radio receiving circuitry receiving RF signals, radio transmitting circuitry transmitting RF signals, and modulating/detecting means for allowing either voice or data communications to be transmitted and received over a radio frequency channel, a current saving control architecture comprising:

a high power programmable processor having a software standby mode and an active mode, said high power processor performing tasks associated with said transmitting and receiving, said high power processor switching from said software standby mode to said active mode in response to receipt of a control signal; and further logic circuitry external to said high power processor, said further logic circuitry generating said control signal upon occurrence of an event associated with said transmitting and receiving, wherein said high power processor is programmed to switch from said active mode to said software standby mode only when: (a) said high power programmable processor has no current tasks to perform, and (b) said high power programmable processor is not scheduled to perform any tasks until at least a minimum predetermined time period has elapsed.

33. A radio transceiver as in claim 32 wherein said control signal is applied to an interrupt input of said high programmable power processor.

34. A radio transceiver as in claim 32 wherein said further logic circuitry includes a low power processor and an interrupt controller external to said low power processor, said low power processor substantially simultaneously performing channel guard and T99 signalling detection.

35. A radio transceiver as in claim 32 wherein said further logic circuitry includes at least one real time timer, and said high power programmable processor uses said real time timer to update time parameters upon switching from said software standby mode to said active mode.

\* \* \* \* \*